US010607288B2

(12) United States Patent
Himmelstein

(10) Patent No.: US 10,607,288 B2
(45) Date of Patent: Mar. 31, 2020

(54) SYSTEM AND METHOD FOR TRADING SECURITIES ON A COMPUTER-BASED NETWORK

(71) Applicant: BarterSecurities, Inc., W. Conshohocken, PA (US)

(72) Inventor: Richard B. Himmelstein, Breckenridge, CO (US)

(*) Notice: Subject to any disclaimer, the term of this patent is extended or adjusted under 35 U.S.C. 154(b) by 237 days.

(21) Appl. No.: 14/542,615

(22) Filed: Nov. 16, 2014

(65) Prior Publication Data

US 2015/0081511 A1    Mar. 19, 2015

Related U.S. Application Data

(63) Continuation of application No. 11/944,042, filed on Nov. 21, 2007, which is a continuation of application No. 11/406,150, filed on Apr. 18, 2006, now Pat. No. 7,587,370, which is a continuation of application No. 09/454,035, filed on Dec. 3, 1999, now Pat. No. 7,080,050.

(60) Provisional application No. 60/147,243, filed on Aug. 5, 1999, provisional application No. 60/153,142, filed on Sep. 9, 1999, provisional application No. 60/161,318, filed on Oct. 25, 1999.

(51) Int. Cl.
| | |
|---|---|
| *G06Q 40/04* | (2012.01) |
| *G06Q 50/18* | (2012.01) |
| *G06Q 30/06* | (2012.01) |
| *G06Q 30/04* | (2012.01) |
| *G06Q 40/00* | (2012.01) |
| *G06Q 20/38* | (2012.01) |

(52) U.S. Cl.
CPC .......... *G06Q 40/04* (2013.01); *G06Q 20/382* (2013.01); *G06Q 30/04* (2013.01); *G06Q 30/06* (2013.01); *G06Q 40/00* (2013.01); *G06Q 50/188* (2013.01)

(58) Field of Classification Search
CPC ........ G06Q 10/00; G06Q 20/00; G06Q 30/00; G06Q 40/00
USPC ..................................................... 705/3–44
See application file for complete search history.

(56) References Cited

U.S. PATENT DOCUMENTS

| | | | | |
|---|---|---|---|---|
| 6,058,379 A * | 5/2000 | Odom | ..................... | G06Q 20/10 705/37 |
| 7,158,956 B1 * | 1/2007 | Himmelstein | ..... | G06Q 20/3674 705/14.39 |
| 7,536,336 B1 * | 5/2009 | Guinan | ................... | G06Q 30/06 705/37 |
| 7,711,603 B2 * | 5/2010 | Vanker | ................. | G06Q 10/087 705/24 |
| 7,908,199 B2 * | 3/2011 | Neff | ....................... | G06Q 40/10 705/37 |

(Continued)

OTHER PUBLICATIONS

Julian et al., "Multi-Agent Systems", Departamento de Sistemas Informaticos y Computacion, Universitat Politecnica de Valencia, Camino de Vera s-n, 46980 Valencia Spain, Appl. Sci. 2019, 9, 1402; doi: 10.3390/app9071402.. (Year: 2019).*

(Continued)

*Primary Examiner* — Frantzy Poinvil
(74) *Attorney, Agent, or Firm* — Robert R. Lech; Lech Law, LLC

(57) ABSTRACT

A method and system for trading securities on a computer-based network. The method and system utilize an ordering module, a graphical user interface, a database module and a matching engine to effect electronic securities trading.

20 Claims, 20 Drawing Sheets

(56) References Cited

U.S. PATENT DOCUMENTS

| | | | | |
|---|---|---|---|---|
| 2008/0015958 A1* | 1/2008 | Vanker | ............... | G06Q 10/087 |
| | | | | 705/28 |
| 2008/0228627 A1* | 9/2008 | Himmelstein | ....... | G06Q 20/382 |
| | | | | 705/37 |
| 2010/0325061 A1* | 12/2010 | Neff | ...................... | G06Q 40/06 |
| | | | | 705/36 R |
| 2013/0297448 A1* | 11/2013 | Lester | ................... | G06Q 30/06 |
| | | | | 705/26.8 |
| 2016/0034989 A1* | 2/2016 | Kline | ............... | G06Q 30/0605 |
| | | | | 705/26.2 |

OTHER PUBLICATIONS

Barbara Cresti, "US domestic barter: an empirical investigation", CORE and IRES, Universte Catholique de Louvain, Place Montesquiey 3, 1348—Louvain-La-Neuve, Belgium. Applied Economics, 2005, 37, 1953-1966. (Year: 2005).*

* cited by examiner

524 — FEE AMOUNT per share is anticipated to be _____, if direct barter (total antcipated fee _____);

526 — FEE AMOUNT per share is anticipated to be _____, if web barter (total antcipated fee _____);

528 — TIMING

| day only ▼ |
| day only |
| good until canceled |
| fill or kill |
| immediate or cancel |
| only view current posts |

530 — SPECIAL CONDITIONS (OPTIONAL)

☐ Minimum quantity [ 600 ▲▼ ]

☐ do not reduce

☐ all or none

☐ deferred settlement date before ____ date after ____

☐ Other security, if any, to be provided at settlement ____

DIVIDEND REINVESTMENT (FOR NEW STOCK)

532

☐ yes, new stock must have a dividend reinvestment program
☐ no, new stock must not have had a dividend reinvestment program
☐ accept new stock with or without a dividend reinvestment program

TYPE OF BARTER

534

☐ direct barter only (fee amount anticipated to be _____)
☐ if direct barter not available, then barter with web site (fee amount anticipated to be _____)

DESIRED ITEM                535            536

Security | AET ▼ |        Industry | Health Care ▼ |

☐ Himmelstein Option for stock
☐ Stock
☐ Cash
537 ☐ Web barter dollars

MARKET DATA FOR AET

Current stock trading price as of 02/15/1999 at time 10:45 am is $ 47.50 .

AVAILABLE BARTER ORDERS

NOTE: CLICK ON ORDER # IF CHOOSE TO DO BARTER

IF MORE THAN ONE SELECTION, CLICK ON SEQUENTIAL PREFERENCE

| ORDER # | SYMBOL | PRICE | RATIO TO STOCK TRADING PRICE | VALUE RATIO | # OF SHARES | BARTER AMOUNT | PRICE FLUCTUATE WITH STOCK TRADING PRICE | SPECIAL CONDITIONS | TIMING | DIVIDEND |
|---------|--------|-------|------------------------------|-------------|-------------|---------------|------------------------------------------|--------------------|--------|----------|
| 1) 1000526 | IBM | 115 | 1.00 | 1.0200 | 120 | $13,800.00 | YES | NONE | 1 | YES |
| 2) 9843566 | IBM | 115 1/16 | .9995 | 1.0194 | 40 | $4,602.50 | NO | MINIMUM 40 | 2 | NO |
| 3) 1043442 | IBM | 115 11/16 | .9941 | 1.0139 | 100 | $11,568.75 | YES | AFTER 2/01/00 BEFORE INDEFINITE SECURITY AT SETTLEMENT=0 | 1 | YES |
| 4) | | | | | | | | | | |

↑ 610

| ORDER # | # OF SHARES GIVING | PRICE OF GIVING ITEM | # OF SHARES RECEIVING | PRICE OF RECEIVING ITEM | BARTER AMOUNT |
|---------|--------------------|----------------------|------------------------|--------------------------|----------------|
| 1) | | | | | |
| 2) | | | | | |
| 3) | | | | | |
| 4) | | | | | |
| 5) | | | | | |
| TOT: | | | | | |

↗ 620

| AMOUNT OF BARTER LEFT — 622 | TIME REMAINING — 626 |
|---|---|
| RESIDUAL AMOUNT LEFT OVER | |

— 624

☐ HOLD IN ESCROW
☐ DONATE IT
☐ PURCHASE OTHER STOCK

| CLEAR | CHANGE BARTER ORDER | FINALIZE TRANSACTION | FINALIZE TRANSACTION BUT DISPLAY MORE OPTIONS |
|-------|----------------------|----------------------|-----------------------------------------------|
| 631 | 632 | 633 | 634 |

| FIG. 9AA | FIG. 9AB |
|---|---|

|   | Class/Type | Item/Identification | Amount | Market Value | Bid/Strike Price | Expiration Settlement/Date |
|---|---|---|---|---|---|---|
| 1 | Stock | Symbol or Name | # Shares | $ | N/A | N/A |
| 2 | Currency | US or Foreign | X | US$ | N/A | N/A |
| 3 | Bonds | Issuer | X | $ | N/A | N/A |
| 4 | Options | Z | N | $ | +/-$ | MMDDYY |
| 5 | Government Bond | Treasury Notes, Bonds or Bills | X | $ | +/-$ | N/A |
| 6 | Futures | Symbol or Name | Measurement Quantity | $ | N/A | MMDDYY |
| 7 | Annuities | Issuer | X | $ | N/A | N/A |
| 8 | CD's | Issuer | X | $ | N/A | N/A |
| 9 | Web Barter Dollars | IOU | X | $ | +/-$ | MMDDYY |

Z = Any security
X = Foreign or domestic currency

*FIG. 9AA*

| Barter Value | Interest Rate/ Current Yeild | Due/Maturity Date | Other | Barter/Settlement Date Open/Close |
|---|---|---|---|---|
| $ or specific Relationship to Market value | N/A | N/A | Dividend? | MMDDYY |
| | | | | MMDDYY |
| US$ or specific Relationship to Market value | N/A | N/A | Par Discount Premium | MMDDYY |
| | | | | MMDDYY |
| $ or specific Relationship to Market value | Y% Interest rate | MMDDYY | N/A | MMDDYY |
| | | | | MMDDYY |
| $ or specific Relationship to Market value | N/A | N/A | N/A | MMDDYY |
| | | | | MMDDYY |
| $ or specific Relationship to Market value | Y% yield rate | MMDDYY | N/A | MMDDYY |
| | | | | MMDDYY |
| $ or specific Relationship to Market value | N/A | N/A | N/A | MMDDYY |
| | | | | MMDDYY |
| $ or specific Relationship to Market value | Y% Interest rate | MMDDYY | Fixed or Variable Interest Rate | MMDDYY |
| | | | | MMDDYY |
| $ or specific Relationship to Market value | Y% Interest rate | MMDDYY | Compound Interest? | MMDDYY |
| | | | | MMDDYY |
| $ or specific Relationship to Market value | Y% Interest rate | MMDDYY | Dividend? Par, Discount, Premium Fixed or Variable Interest Compound Interest? | MMDDYY |
| | | | | MMDDYY |

Y = Interest rate or current yield in percentage
N = Quantity of options

| | FIG. 9BA | FIG. 9BB |
|---|---|---|

| | Class/Type | Item/Identification | Amount | Market Value | Bid/Strike Price | Expiration Settlement/Date |
|---|---|---|---|---|---|---|
| 1 | Stock | AOL | 100 Shares | $ 10,900.00 | N/A | N/A |
| 2 | Currency | Canadian $ | 5,000 CN$ | $ 3,453.04 | N/A | N/A |
| 3 | Bonds | Mirage | 25,000.00 | $24,750.00 | N/A | N/A |
| 4 | Options | IBM | 12 Options | $ 122,400.00 | $ 102.00 | 30-Nov-99 |
| 5 | T-Bills | US Government | $10,000.00 | $ 10,000.00 | $ 101.00 | N/A |
| 6 | Futures | Gold | 10 troy oz | $ 3,157.50 | N/A | 30-Nov-99 |
| 7 | Annuity | TransAmerica | $100,000.00 | $ 100,000.00 | N/A | N/A |
| 8 | CD's | SunWest Bank | $50,000.00 | $50,000.00 | N/A | N/A |
| 9 | Web Barter Dollars | IOU | $25,000.00 | $25,000.00 | A | B |

A = Could have Bid Strike Price if Web Barter $ are from Options or Government Bonds + CD depending on terms and conditions in barter transactions B = Could have Expiration Date if Web Barter $ are from Options or Futures depending on terms and conditions in barter transactions

FIG. 9BA

| Barter Value | Interest Rate/ Current Yeild | Due/Maturity Date | Other | Barter/Settlement Date Open/Close |
|---|---|---|---|---|
| $ 10,750.00 | N/A | N/A | Dividend? | 01-FEB-01/ 29-FEB-01 |
| $ 3,448.28 | N/A | N/A | N/A | 02-JAN-00/ 02-JAN-00 |
| $ 24,900.00 | 8.50% | 1-MAR-15 | Par, Discount, Premium | 24-DEC-03/ 28-DEC-04 |
| $ 12,840.00 | N/A | N/A | N/A | 4-OCT-99/ 4-NOV-99 |
| $ 9,800.00 | 4.93% | 15-Jun-00 | N/A | OPEN/ 15-DEC-99 |
| $ 3,000.00 | N/A | N/A | N/A | OPEN/ 31-OCT-99 |
| $ 105,000.00 | 10.50% | 10-Jun-06 | Fixed or Variable Interest | 02-JAN-02/ 12-JAN-02 |
| $ 49,000.00 | 4.14% | 10-May-00 | Compound Interest? | 12-DEC-99/ 12-DEC-99 |
| $ 24,500.00 | C | D | Dividend? Par, Discount, Premium Fixed or Variable Interest Compound Interest? | OPEN/ 15-JUN-01 |

C = Could have Yield or Interest Rate if Web Barter $ are from Bonds, Government Bonds, Annuities or CD's depending on terms and conditions in barter transactions D = Could have Maturity Date if Web Barter $ are from Bonds, Government Bonds, Annuities or CD's depending on terms and conditions in barter transactions

*FIG. 9BB*

SYSTEM AND METHOD FOR TRADING SECURITIES ON A COMPUTER-BASED NETWORK

RELATED APPLICATIONS

This application is a continuation of pending U.S. patent application Ser. No. 11/944,042 filed Nov. 21, 2007 which is a continuation of U.S. parent application Ser. No. 09/454,035 filed Dec. 3, 1999, issued as U.S. Pat. No. 7,587,370, which claims the benefit of U.S. Provisional Patent Application No. 60/161,318, filed Oct. 25, 1999; U.S. Provisional Patent Application No. 60/153,142, filed Sep. 9, 1999; and from U.S. Provisional Patent Application No. 60/147,243, filed Aug. 5, 1999.

BACKGROUND

This application relates to a computer-based website for bartering, exchanging or selling, (hereinafter referred to as bartering), items or securities including but not limited to, stock, cash (foreign or domestic currencies), web barter dollars (defined below), Himmelstein Options (defined below), CD's, bonds, notes, Option Put, Option Call, Commodities/Futures, Annuities, Muni Bond(s), Government Bonds, Funds, Strips (Zero Coupon Treasuries), Ginnie Mae(s), Fannie Mae(s), Freddie Mac(s), UIT (Unit Investment Trust), T-bills and any fixture created or defined security, commodity or commodity money wherein a barter order indicating the item to barter and the desired barter item are matched by the website. Barter transactions are made which combine a barterer's barter order with a matching order or combination of orders which the barterer selects or the barterer has automatically selected by the website. All barter transactions incorporate agreements. Agreements, termed Himmelstein Options, permit barterers to agree to a future range of dates: a date after the barter transaction may occur and a date before the barter transaction must occur or the rights of ownership may expire. Himmelstein options also include other conditions or parameters in the agreement as well.

Automated computer systems matching buy and sell orders for trading stocks, futures and other properties are well known in the art. An example of such a system is disclosed in U.S. Pat. No. 3,573,747 to Adams, et al., which discloses a system for matching buy and sell orders for fungible properties between traders. After the initial match, one embodiment of this system allows traders to negotiate other terms of the transaction while all traders are continuously appraised of the negotiation status. The system disclosed in U.S. Pat. No. 4,412,287 to Braddock relates to trading stock and discloses a central computer that matches buy and sell orders from a plurality of user terminals. In U.S. Pat. No. 5,689,652 to Lupien, et al. a computer network with a plurality of trader terminals matches buy and sell orders incorporating a satisfaction density profile. The density profile provides a measure for maximizing the mutual satisfaction of all traders.

Computer systems to match bids and offers are also well known in the art. The system disclosed in U.S. Pat. No. 4,903,201 to Wagner matches bids and offers for future commodity contracts and detects illegal trade practices. U.S. Pat. No. 5,727,165 to Ordish, et al., discloses a network system and further provides confirmation timing and notification messaging to the traders. In U.S. Pat. No. 5,924,082 to Silverman, et al., a negotiated matching system matches bids and offers based on a criteria that includes "ranking" data. The ranking data is comprised of credit and risk information to facilitate the best matches with respect to risk management. Another aspect of this same system permits traders to negotiate directly with each other prior to or after an initial match is made by the system. The system of U.S. Pat. No. 5,926,801 to Matsubara et al. also matches bids and offers, and in one embodiment, credit criteria is considered in the match.

Another computer system disclosed in U.S. Pat. No. 5,873,071 to Ferstenberg, et al. includes an intermediary computer program and an electronic agent computer program which can operate over the Internet. The intermediary computer program mediates offers and counter-offers for financial commodities. Goals, expressed as either a set of computer rules or as an objective with constraints, are set by the participants and the electronic agent computer program generates counter-offers according to the goals in response to offers from the intermediary computer program. In one embodiment of the system, a calculated "fairness measure" is used to determine satisfaction of the participants goals.

None of these patents address a bartering, exchanging or selling system whereby an individual trader constructs a barter order by establishing trading parameters that include an item to be bartered and a desired item to be received. Accordingly, none of these systems characterize potential barter exchanges in a quantifiable manner for the individual trader. The known electronic systems also fail to provide a means for assisting traders in the selection of trading items from that trader's portfolio of financial instruments.

SUMMARY

It is an object of this application to provide an electronic bartering system for bartering items or securities including but not limited to, stock, cash (foreign or domestic currencies), web barter dollars, Himmelstein Options, CD's, bonds, notes, Option Put, Option Call. Commodities/Futures. Annuities, Muni Bond(s), Government Bonds, Funds, Strips (Zero Coupon Treasuries), Ginnie Mae(s), Fannie Mae(s), Freddie Mac(s), UIT (Unit Investment Trust), T-bills and any future created or defined security, commodity or commodity money. A Himmelstein Option is an agreement to barter items or securities with specific conditions for a settlement date (i.e. rights to acquire) to occur after a specified date and before a specified date. These dates may be the same. The before date may be indefinite. Himmelstein's Options (i.e. the portion of the barter transaction that is to be acquired) may be sold for cash or bartered (i.e. assign their rights or transfer their rights for a different security). In other words, the Himmelstein Option agreement once acquired may be assigned without the written consent of the issuer/creator. This means that acquirer may transfer his rights to acquire the security or other item which is the subject of a Himmelstein Option to someone else.

The user, termed the barterer, creates a barter order that is posted and/or matched against a website database of other posted barter orders. To implement a barter, the barterer selects a posted barter order from a display of matching barter orders. Barter orders include minimum criteria such as an identification of items to be bartered, an identification of items desired, market value of the items to be bartered and value determined by the barterer. Criteria such as the Himmelstein Option having barter date ranges (i.e. date upon which the actual ownership of the barter items changes hands) and value ranges add to the flexibility of the system. The flexibility in timing utilizing the Himmelstein Option facilitates the ability to potentially defer adverse tax consequences and to defer the creation of taxable events.

It is an object of this application to provide a barterer with a systematic means for evaluating the financial benefit of potential matching candidate barter orders.

Another object of this application is to provide a barterer with a means of selecting an item to be bartered from a current investment portfolio of the barterer.

It is another object of this application to provide a flexible barter system which allows ownership acquisition deferral and the matching of multi-order barter transactions. Other, objects and advantages will become apparent after reviewing a detailed description of a presently preferred embodiment.

BRIEF DESCRIPTION OF THE DRAWINGS

FIGS. 5A-5F are portions of screen displays illustrating the creation of a sample barter order in accordance with the teachings of the present application.

FIG. 6 is an example of a barter transaction screen in accordance with the teachings of the present application.

FIGS. 9A and 9B are tables illustrating general and specific parameters for classes of barter items that are preferably utilized in a barter system made using a Himmelstein Option in accordance with the teachings of the present application. Specifically, the "barter/settlement date, open/close" column in the tables is a condition or parameter included in the Himmelstein Option.

DETAILED DESCRIPTION

Several example embodiments will be described with reference to the drawings where like numerals represent like elements throughout.

The Himmelstein Option is a new type of financial interest being created by the systems and methods of the present application. Utilizing Himmelstein Option(s) allows the creation a new type of market ("virtual market"), whereby barters may own and/or barter Himmelstein Options for Himmelstein Options, indefinitely, without having to possibly incur ordinary or capital gains taxes. Furthermore, as long as the individual who owns a Himmelstein Option or is in the possession of a Himmelstein Option does not go to settlement and "take title", the actual owner of the security defers a taxable event.

The system creates web barter dollars to further its ability to facilitate a virtual market. Web barter dollars are the system's currency with a unit (commodity dollar) which is preferably set to equal the U.S. dollar or some other standard such as foreign currency, gold etc. The system, for example, uses web barter dollars to track an "I owe you" ("IOU") to individuals giving up a security but not simultaneously receiving a security back. Preferably, the system uses web barter dollars to supplement or balance a barter in lieu of other currencies such as the U.S. dollar. Using web barter dollars or cash simplifies the matching of barter orders where items of unequal value are traded.

When converting IOUs or web barter dollars to a different security, the system may charge a different fee based on the age of the IOUs. For instance, if the IOU is to be held longer, the system may charge a lower percentage or lower fee to convert to U.S. dollars. Further, the system may charge a different fee or a different percentage based on the relationship with a particular individual requesting the conversion. The system and barterers may barter web barter dollars for cash at different values. For example, the system may charge a fee to convert from web barter dollars to cash, but as an incentive provide extra web barter dollars for cash. Should there ever be a need to have the system redefine or modify its definition for IOUs or web barter dollars, the system reserves the right (in the Agreement(s)) and can do so. For example, the system may change IOU's or web barter dollars to system funds which are portable and permit a barterer to transfer shares of system funds to specific institutions without having to redeem shares and possibly incur a taxable event. Accordingly, those skilled in the art should recognize that the system can be configured to perform any, and all stock market, banking and financial institution functions.

Figure 1:
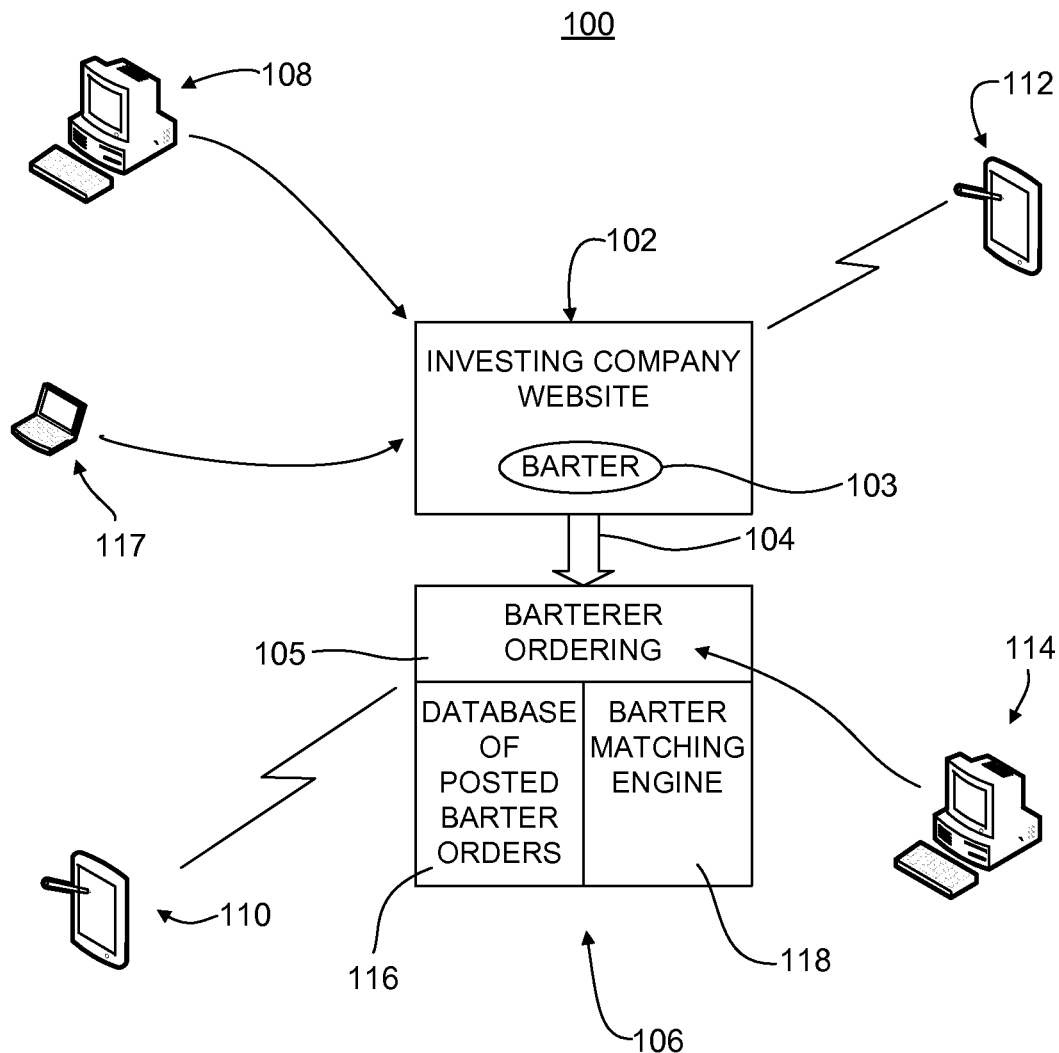
FIG. 1 is a diagram of a bartering system in accordance with the teachings of the present application.

Referring to FIG. 1, an exemplary barter system 100 is illustrated which utilizes a computer-based website that may effectuate a tax-free exchange or tax deferred exchange for swapping barter items. Barter items are defined including, but not limited to, stock, cash (foreign or domestic currencies), web barter dollars, Himmelstein Options, CD's, bonds, notes, Option Put, Option Call, Commodities/Futures, Annuities, Muni Bond(s), Government Bonds, Funds, Strips (Zero Coupon Treasuries), Ginnie Mae(s), Fannie Mae(s), Freddie Mac(s), UIT (Unit Investment Trust), T-bills and any fixture created or defined security, commodity or commodity money. Bartering different categories of items is supported by the system 100. For example, stocks can be bartered for bonds. The system 100 provides for its own "web-barter dollars" which may be accumulated or traded by barters using the system 100 and are particularly useful in facilitating barters where items of unequal value are traded.

The system 100 preferably includes a barter website 106 which is accessed via an investing company website 102, or directly via the Internet using a computer such as a personal computer 114 or a wireless hand-held computer with Internet connectivity 110. Optionally, the system 100 may be incorporated as part of an existing investing company's website.

In the case of access via an investing company website 102, the barterer uses a computer such as a personal computer 108, a portable computer 116 or a wireless hand-held computer with Internet capability 112 to select a "Barter" icon 103 that incorporates a link 104 to the barter website 106. Once the icon is selected, the trader's investing company account information is transferred via a link 104 to the barter website 106. In this manner, the barter website 106 is produced with all of the relevant particulars of each item owned by the individual trader. For example, in the case of bonds, the website 106 preferably includes the entity that issued bonds, amount of bonds, market value, interest date and due date data. In the case of stocks, the barter website 106 preferably includes data indicating company, number of shares, market value and whether dividends are reinvested. Using the link 104, the barter website 106 is transparent to a barterer accessing it via the investing company website 102.

The system 100 can be further interfaced with traditional brokers so traditional brokers and clients without the resources to go directly "online" can barter in the same manner.

While the barter system 100 supports bartering different categories of items such as stocks, Himmelstein Options for stocks, notes, Himmelstein Options for notes, bonds, and Himmelstein Options for bonds, an online investing company hosting the "Barter" icon 103 can limit barters to certain categories of items. For example, an investment company website that provides online stock trading may chose to limit the barter website 106 to only stock and/or Himmelstein Options for stock and/or Himmelstein Option barters. This allows someone (a barterer) to acquire a Himmelstein Option which is, in this case, the right to own stock at a future date which allows the other barterer the ability to delay or defer the taxable event. This is accomplished by setting an appropriate filter so that only stock and/or Himmelstein Option is identified in the barter orders. Preferably, such a filter also allows use of web-barter dollars and/or cash which enables a wider range of barter orders to be matched and barter transactions to be completed.

Regardless of the items bartered, the barter website 106 comprises three main components: a barter ordering module 105, a posted barter order database module 117 and a barter matching engine 118. Optionally, the system 100 may include a separate database (not shown) of each individual's portfolio for all securities. In general, the barter ordering module 105 permits a trader, herein referred to as the barterer, to create a barter order that includes the item to be traded, the item desired and additional parameters related to the barter order.

The table set forth in FIG. 9A reflects typical parameters associated with various classes of items or securities to be identified in a barter order. In each barter order, the appropriate parameters are identified for both the item to be traded and the item to be acquired so that the barter order comprises two sets of item parameters. The two sets of parameters may be quite different where the two items which are the subject of the barter order are of a different class or type.

Each portfolio item, regardless of type or classes, can be transformed into a Himmelstein Option agreement by defining a future date or range of dates for settlement using the last column in the table FIG. 9A. The Himmelstein Option is posted for immediate barter, but is subject to the specific settlement date or range identified.

A Himmelstein Option permits a security to go "under agreement" with a specific future closing date, (similar to a purchase of real estate). Presently, the IRS does not treat this as a taxable event at the time of the agreement. An individual who owns a Himmelstein Option may barter it again (with the same or different terms as the original agreement) without having settlement and obtaining ownership of the underlying security. Obviously, "different terms" are limited to a subset of terms of the original Himmelstein Option agreement that was issued.

The "standard" Himmelstein Option requires that the individual acquiring the Himmelstein Option must put up the full amount of the desired security at that time, (i.e. and nothing at settlement). If the desired security is also a Himmelstein Option, providing the rights to acquire or transferring the rights meets this requirement. It should be noted that each Himmelstein option may have different future dates for settlement. The IRS may attempt to claim that this constitutes a derivative. However, if an individual is bartering away a security and barters for a security, on future dates utilizing Himmelstein Options, they are receiving a derivative and giving away a derivative Consequently, in most cases, these derivatives in essence, "cancel out." The system 100 may further require that the barterers agree on the value for the Himmelstein Option should the IRS consider it a derivative. Preferably, the system sets the "barter value" as the default agreed upon value.

The person who issues a Himmelstein Option or barters an acquired Himmelstein Option chooses the future date or range of dates for settlement and value which must be accepted by the acquirer. If there was a future range of dates given for settlement, it is the choice of the person acquiring the Himmelstein Option to go to settlement within the specified range. The "standard" Himmelstein Option automatically goes to settlement on the final day should the person acquiring the Himmelstein Option not choose a date. The system 100 may charge an additional fee for the actual settlement.

When an individual creates a barter order for any security, the system 100 produces an Agreement of Barter, Exchange or Sale (i.e. terms and conditions). Barterers, in essence, fill in the "blanks" of the Agreement of Barter Exchange or Sale. The system 100 may also require electronic signatures to accompany the Agreement or may create a parallel Agreement for each barterer for simplicity and anonymity purposes. The Agreement is also with the system 100, providing various conditions or rights that the system 100, intermediary or designated agent(s) has with the barterer.

At settlement, title to the security or financial interest which is the subject of the Himmelstein Option is transferred. For stock, for example, settlement may require the actual transference of Stock Certificates. Preferably the traded stocks are not in paper certificate form so that a book entry of the stock transfer may be made to transfer title.

Once bartered, a Himmelstein Option cannot be canceled by its creator. Himmelstein Options may continually be bartered without being required to have settlement. Examples of a Himmelstein Option with appropriate parameters for each of nine different classes/types of items are set forth in the table of FIG. 9B. Similar to FIG. 9A, in FIG. 9B each row shows one of the items of a barter order, i.e. an item to be bartered or an item to be acquired. A Himmelstein Option may be identified as a "to be bartered item" and actual stock may be identified as a "to be acquired item" in a given complete barter order. A Himmelstein Option may be acquired via the barter system as soon as it is posted, but the actual ownership of the financial interest which is the subject of the option is not transferred to the acquiring party until the acquiring party exercises the Himmelstein Option during the settlement period.

When the barterer creates a barter order, the system 100 creates an order number referencing the barter order. The system 100 may randomly create or code barter order numbers so only the system 100 is aware of the age of a barter order and the identity of the barterer. The posted barter order database module 116 accumulates posted barter orders and includes the software to add, delete and maintain the data in the database. The barter matching engine 118 selectively matches a barterer's barter order with posted barter orders in the database 116. Posted barter orders "matching" a barterer's order are displayed such that the barterer can select a candidate or candidates from the displayed listing of matching posted orders. The matching process functionally operates as a filter to display posted orders matching a selected criteria. Preferably, the filter is set to match the barterer's selected item to be acquired with posted orders having the same item to be bartered. The quantity of the selected item may also be used for filtering to require a direct quantity match or a match within a quantity range. The barterer's selected item to be bartered is also a preferred criteria for the matching filter, so that postings are displayed of barter orders which seek to acquire the item selected to be bartered by the barterer. A preferred filter includes both the barterer's selected item to be bartered and selected item to be acquired. Optionally, the filter may allow both specific items of a class as well as Himmelstein Options for the specific items. Thus, where a barterer's desired item is IBM stock, posted barter orders seeking to barter away IBM stock or Himmelstein Options for IBM stock are displayed as matches.

The barter matching engine 118 is configurable to either match one "best" posted order or multiple posted orders with a barterer's order. The barter engine 118 can also be configured to use the barter website (or an entity chosen by the website) as an intermediary as explained in greater detail below.

Figure 2:
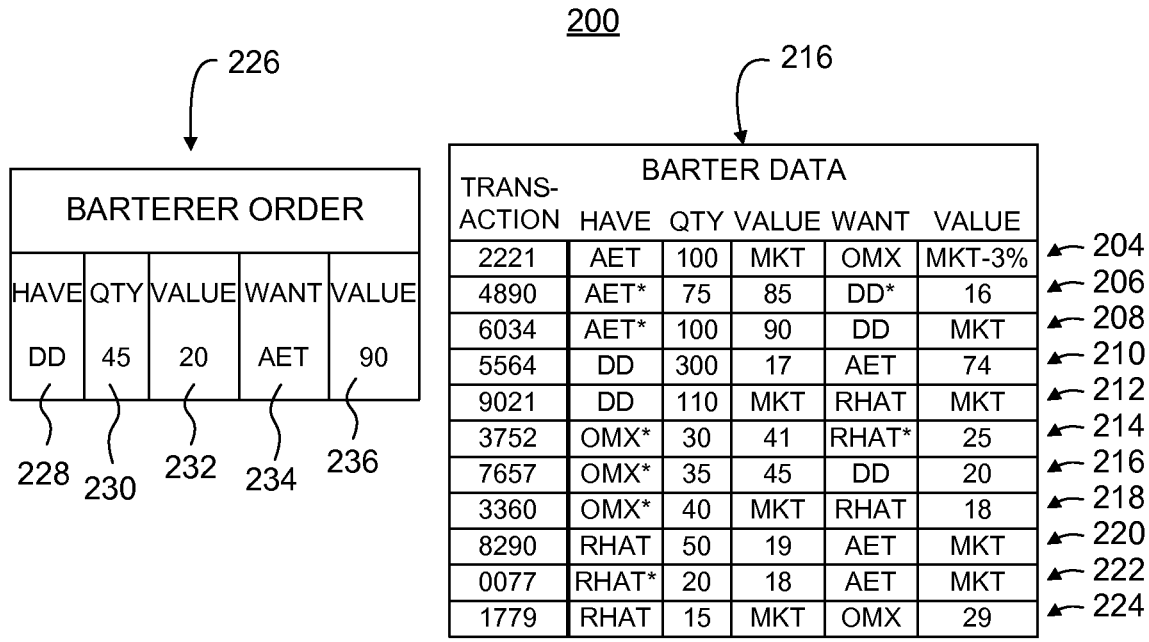
FIG. 2 is a schematic diagram of the structure of an example barter database and barter order in accordance with the teachings of the present application.

FIG. 2 illustrates a typical stock and/or Himmelstein Option for stock and/or Himmelstein Option barter transaction involving sample posted barter orders 204-224 stored in a database 216 of module 116 and a sample barterer's barter order 226. In this example, the barter order includes the stock to be bartered indicated by stock symbol 228, the quantity 230 of the stock to be bartered, the value 232 at which the barterer is willing to barter, the desired stock 234 indicated by stock symbol, the value 236 the barterer is willing to barter for the desired stock, and an "*" indicating the ownership of the Himmelstein Option for the stock instead of ownership of the stock itself. Preferably, the settlement date(s) are displayed for all Himmelstein Options. The stock values of a barter order need not be a fixed value. For example, values identified for several of the posted barter orders 204, 208, 212, 218-224 are based on the current market price of at least one of the respective stocks Barterer order 226 indicates that the barterer has 45 shares 230 of Dupont stock (stock symbol DD) 228 which the barterer is willing to trade at a value of $20 per share 232 for Aetna stock (stock symbol AET) 234 at a value of $90 per share 236. If the matching criteria is set to match only the barterer's acquire item selection (including Himmelstein Options for the item), orders 204, 206, 208 are displayed. If the matching criteria is set to match only the barterer's barter item selection (including Himmelstein Options for the item), orders 206, 208, 216 are displayed. If the matching criteria is set to match either the barterer's barter or acquire item selection (including Himmelstein Options for the item), orders 204, 206, 208, 216 are displayed. If the matching criteria is set to match both the barterer's barter and acquire item selections (including Himmelstein Options for the item), orders 206 and 208 are displayed. An order combining orders 204 and 216 may also be displayed in that situation.

Other criteria such as market value and the other parameters identified in FIGS. 9A and 9B for each barter item may be displayed and used for matching. For example, where barter value is required to be matched, if the market value of Dupont stock is $20 per share, the barter engine 118 matches the order 226 with only one of the posted barter orders from database 216 namely, with posted barter order 208 from the database 216 since this posted order 208 barters Aetna stock for Dupont stock at the same value prices.

Where an additional matching parameter is set that all of an item of a barter order must be bartered, the Himmelstein Option for all 100 Aetna shares of posted barter order 208 must be bartered. In the example, the barter matching engine 118 would then fail to match barter order 226 with any posted order unless the barter website 106 acts as an intermediary as described below. Conversely, in an embodiment where the barter orders include a minimum share barter parameter, the barter engine 118 matches barterer order 226 if the minimum share parameter of the posted barter order 208 is less than 11 shares.

Figure 3:
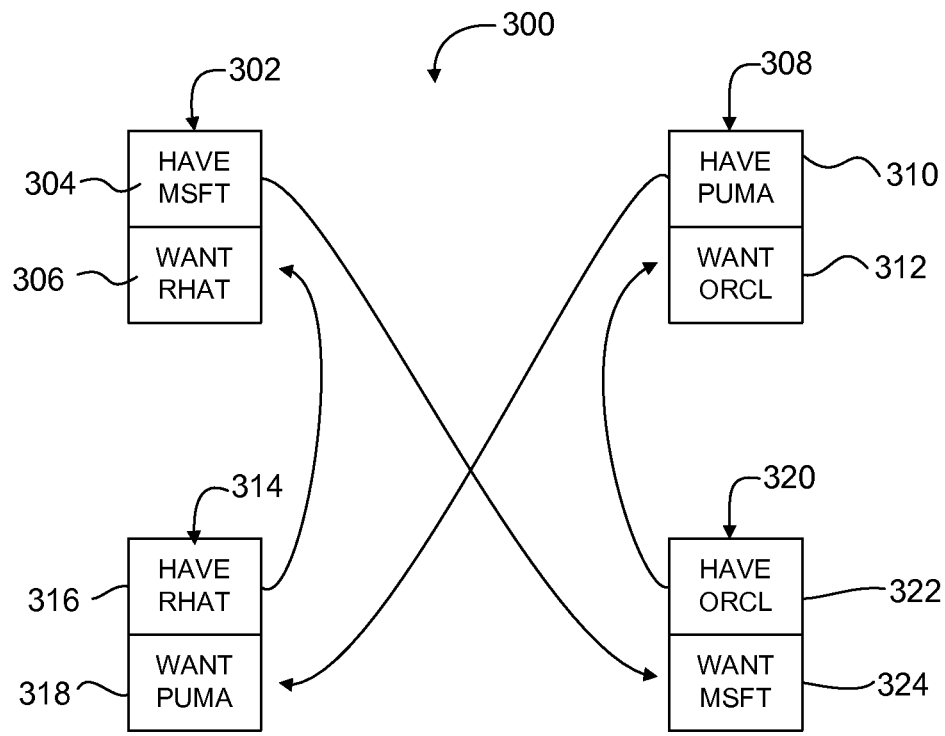
FIG. 3 is a schematic diagram of a multi-order barter transaction in accordance with the teachings of the present application.

FIG. 3 illustrates a multi-order barter selection 300 having first 302, second 308, third 314 and fourth 320 barter orders according to the present application. Multi-order barter selection may be used either when no single barter order matches are found irrespective of whether single barter orders matches are found in order to find all potential available barters among the posted barter orders. In this example, the barter engine 118 cannot fulfill the first barter order 302 with a single one of the other barter orders 308, 314 or 320. The first barter order 302 barters Microsoft stock (stock symbol MSFT) 304 for RedHat stock (stock symbol RHAT) 306. None of the other posted database orders barter RHAT for MSFT, but barter order 302 can be fulfilled if intermediate barters are matched. The barter matching engine 118 matches intermediate barters using several methods. In one embodiment, barter matching engine 118 searches for a posted barter order having a desired stock/ Himmelstein Option that matches the barterer's stock/Himmelstein Option to be traded. Since posted barter order 320 lists MSFT as the desired stock 324 and the first barter order 302 stock to be bartered is MSFT 304, the barter matching engine 118 search for the first half of the first barter 302 has been satisfied. However, the barter matching engine must find a match for the desired stock 306 for the first barter order 302 and must also find a match for the first half 322 of the third barter order, 320. Accordingly, the barter matching engine must find a transaction that satisfies the desired stock Oracle (stock symbol ORCL) 322 of the third barter order 320.

The barter matching engine 118 searches for an order that trades ORCL for RHAT in order to make a two posted order barter transaction. However, in the example, there is no posted order that trades these two stocks, so the barter matching engine 118 locates barter order 308 that trades Puma Technologies (stock symbol PUMA) 310 for ORCL 312. The barter matching engine 118 then searches for another posted barter order that trades RHAT for PUMA to find a transaction candidate. Barter order 314 meets this criteria in that RHAT 316 is traded for PUMA 318. Accordingly, barterer order 302 can be satisfied through posted barter orders 320, 308 and 314. In a preferred embodiment so as to make the multi-order transactions transparent to the barterer, barter matching engine 118 displays multi-order barters as a single "phantom" posted barter order. The matching engine 118 creates a transaction and displays this phantom barter order in the list of matching barter candidates. The barterer simply selects the phantom barter order to finalize the multi-order barter transaction. In these examples, it is assumed that the values and other parameters set by the barterers permit all barter orders to occur.

In another method for locating multi-order barters, barter matching engine 118 begins by searching for the barterer's desired stock 306 first. Barter engine locates barter order 314 that trades RHAT 316 for PUMA 318. Continuing in this manner, the engine locates the same posted barter orders as above, but in the reverse order. In general, the engine 118 attempts to link multiple barter orders. One of ordinary skill in the art of software programming appreciates that a recursive algorithm is well suited for generation of such a linked list.

The operation of barter ordering module 105 allows the barterer to enter the barter order. In one embodiment, the barterer selects minimum barter order parameters such as the specific stock, quantity and value price of the stock to be bartered in addition to the desired stock and value price for the stock desired. Once these minimum parameters are selected, other parameters are set to default settings determined by barter ordering module 105. In another embodiment, order parameters have interdependencies. For example, a barterer selects a quantity of shares of a stock to be traded as 100 shares and sets the per share value price to $15. The total value of the stock, $1,500, is computed by the barter ordering module as the product of the quantity of shares, 100, and the per share value price, $15. In the case where the barterer subsequently changes the total value of the stock from $1,500 to $2,000, the per share value price of the stock changes automatically to $20 since the value per share must be $20 to achieve the $2,000 total value with the 100 shares.

Barter orders may be created for stock and Himmelstein Option for stock barters as illustrated in flowcharts FIGS. 4A-4E and the screen displays of FIGS. 5A-5F where the barterer is prompted through each step of the barter order creation process. For bartering other securities or financial interests, including Himmelstein Options, the bartering steps and screen displays are modified to preferably accommodate all of the parameters for the classes of items identified in FIGS. 9A-9B.

The system 100 in its most generalized configuration permits barters of different securities, financial interests (including Himmelstein Options), or classes of items, i.e. Himmelstein Option for stocks for bonds, foreign currency for Himmelstein Option for T-bills, commodities for stocks, options for T-bills etc. The most generalized configuration of the system 100 permits a barter to select any item in the barterer's portfolio of securities or financial interest as the subject of a Himmelstein Option which is immediately available for bartering where the title to the security or financial interest is not actually transferred until the Himmelstein Option is exercised in the range of settlement dates specified by the barterer creating the Himmelstein Option. Where a barterer's portfolio includes such Himmelstein Options, that barterer may create a Himmelstein Option of the Himmelstein Option in which case the range of settlement dates would be within the settlement date range of the original Himmelstein Option.

In the example of FIGS. 4 and 5, barter website 106 is accessed via an online stock trading company that limits bartering to stocks, Himmelstein Options for stock, cash, web barter dollars and combinations thereof. The flowchart of FIG. 4A begins after the trader selects "Barter" icon 103. Accordingly, barter ordering module 105 has received from the online stock trading website a barterer's list of currently owned stocks, Himmelstein Options for stock, web barter dollars and cash in the barterer's portfolio as well as the quantity and other specifics of these securities via link 104. At step 402 FIG. 4A, the website displays all of the barterer's stock, Himmelstein Options for stock, web barter dollars and cash available for barter. In step 404, The barterer selects from the displayed items in step 402.

Figure 5A:
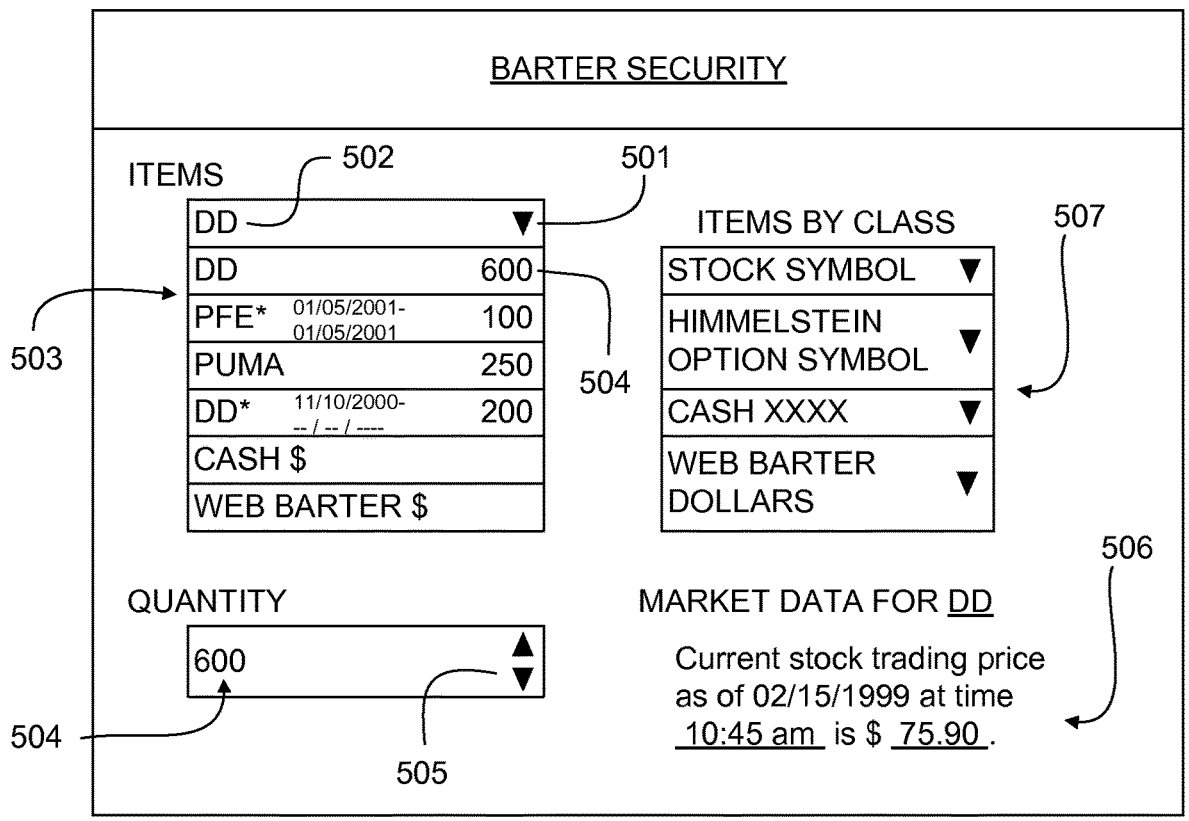

In the embodiment of FIG. 5A, a symbol 502 representing a selection of the barterers portfolio of stocks, Himmelstein Options for stock, web barter dollars and cash is displayed. The barterer selects, the downward triangle 501, to display all available stocks, Himmelstein Options for stock, web barter dollars and cash as shown in 503, an * indicating the ownership of a Himmelstein Option for the stock and date or range of dates for settlement instead of ownership of the stock itself. Preferably, blanks are provided to indicate an indefinite opening or closing for the Himmelstein Option settlement period. For example, the DuPont Option, DD* is depicted having an indefinite closing date.

The system preferably further indicates if the barterer's security is currently included in a posted barter order requiring the barterer to cancel said posted barter order prior to selecting the security for a new barter order. Optionally, an alphabetical list of companies and/or stock symbols is displayed for alphabetical searching and/or the portfolio quantity 504 of the stock is also displayed. The barterer may enter the selected item 502 by typing it in. Preferably when the barterer begins typing the name or symbol of the company, the barter ordering module locates the first listed item that matches the entered characters. Alternatively, the portfolio is displayed for selection via an array of pull down menus 507, each displaying one class of the items of the barterer's portfolio.

Figure 4A:
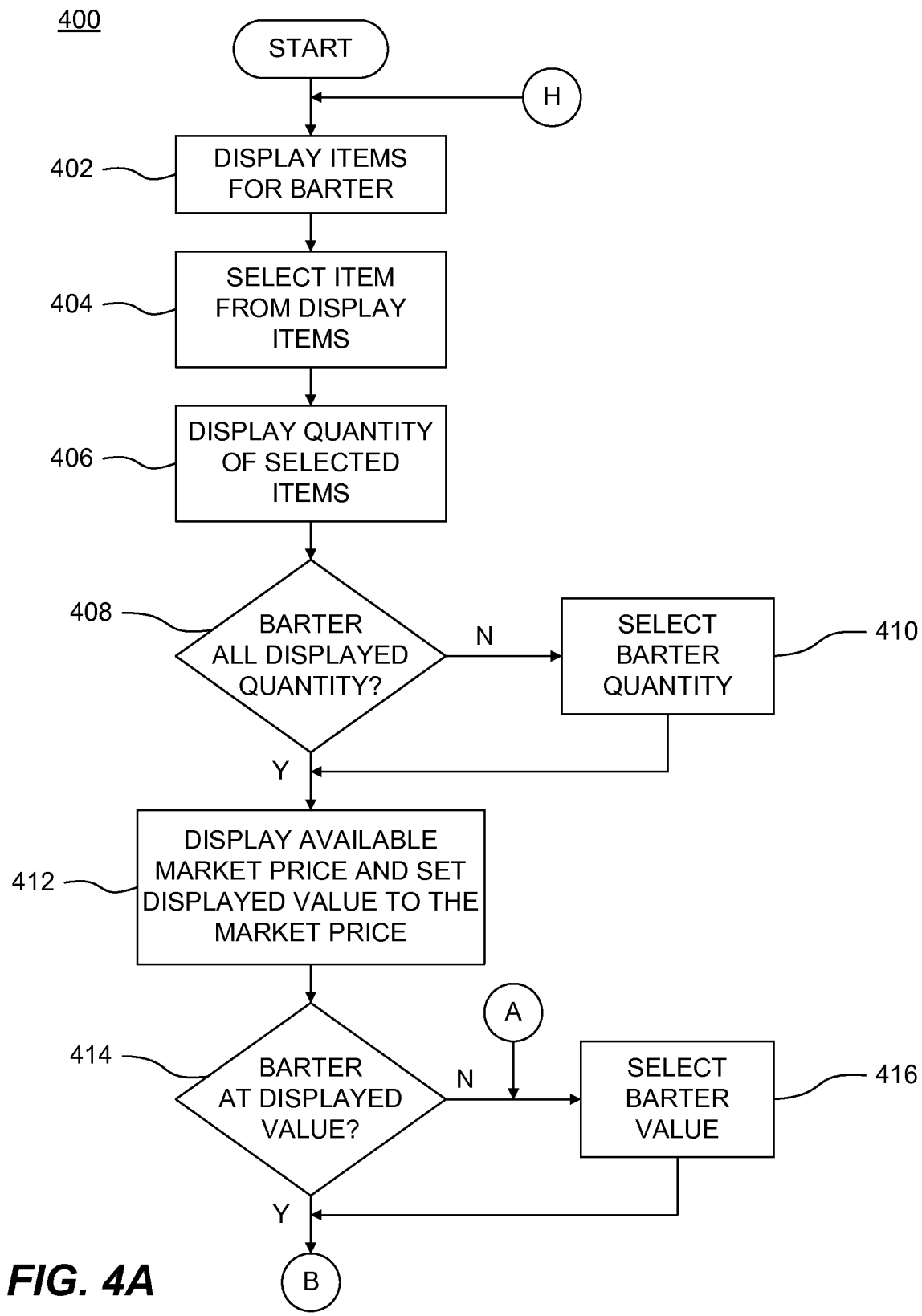
FIGS. 4A-4E are flowcharts of a typical barter ordering session and barter transaction in accordance with the teachings of the present application.

Once the barterer locates and selects the item to be traded, the total quantity of the selected item in the barterer's portfolio (as may be provided by the online stock trading website) is automatically displayed in step 406 of FIG. 4A as the quantity to be bartered. At step 408, the barterer can modify the quantity to be bartered 410. As shown in FIG. 5A, the quantity 504 can be modified via selection of the directional arrows 505 or the barterer can enter a new quantity value. In either case, in this embodiment the barter order module 105 does not allow a quantity value that exceeds the quantity owned by the barterer. Alternatively, the system 100 may be configured to permit the barterer to select a range of quantities to be bartered. For example, the barterer may specify a range such as 50-100 shares for barter.

Figure 5B:
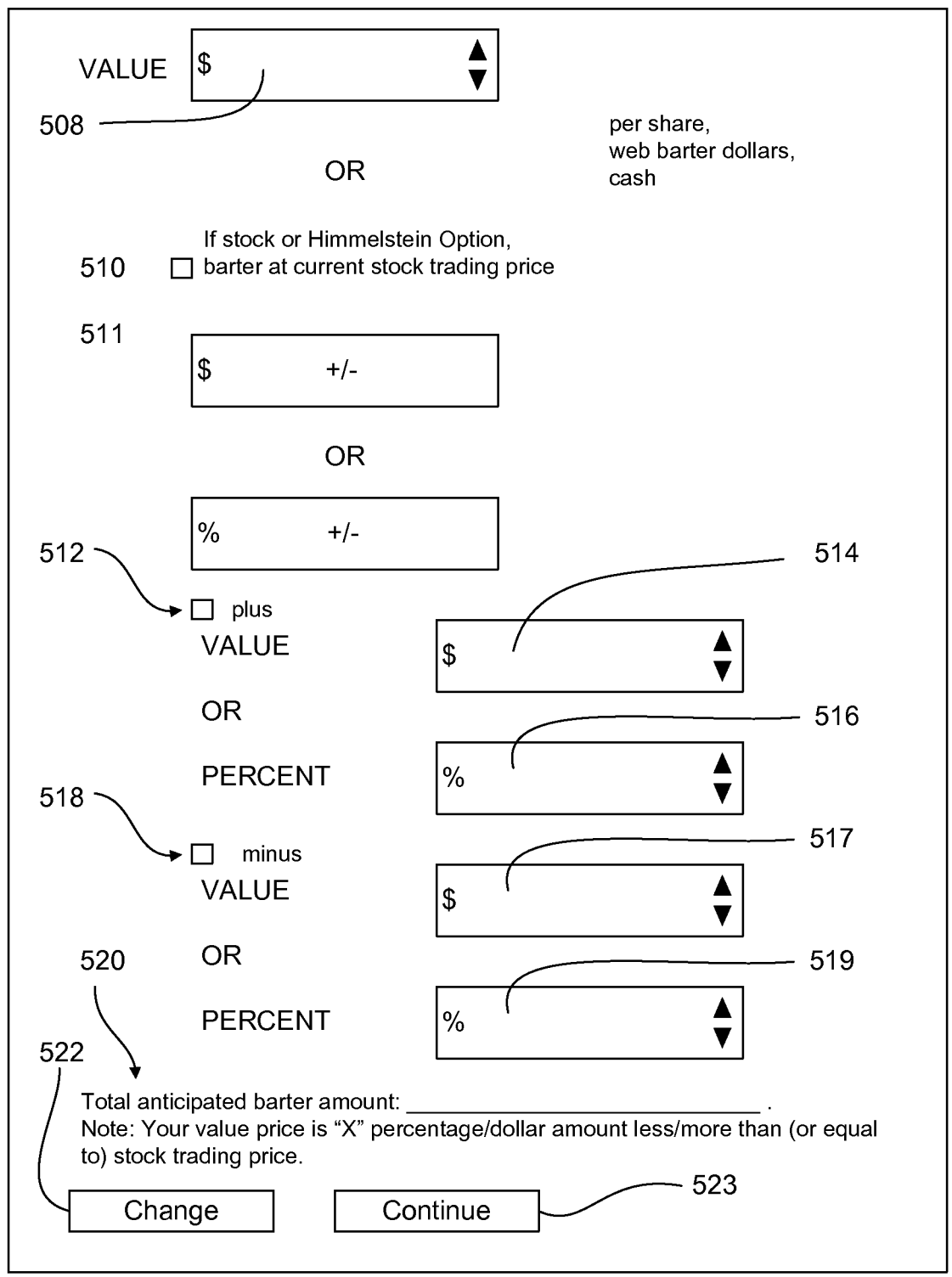

Preferably, the barter ordering module 105 has access to trading prices at step 412 of FIG. 4A, so that the trading price of the selected stock is displayed along with the time and date of the trading price as illustrated in display section 506 of FIG. 5A. A fixed per share value of the stock or Himmelstein Option 508 of FIG. 5B is initially set to the trading price. If barterers are trading away cash or web barter dollars, the system 100 in that instance may rearrange the screens and prompt the security being bartered for prior to prompting the cash or web barter dollars being traded away. As one skilled in the art will realize, the fields which are not applicable to cash or web barter dollars are modified to properly reflect what is being bartered. At step 414 of FIG. 4A, the barterer can elect to trade at the displayed trading price or select a new barter value 416. As FIG. 5B illustrates, the barterer can change the default fixed per share value 508 or select the value of the stock to be bartered based on the fluctuating stock trading price by selecting block 510.

By selecting the fluctuating value price, the value fluctuates until a barter transaction is finalized by a subsequent barterer who selects the barter order. For example, if IBM stock was trading at $115 per share and the barterer selects "barter at current stock trading price", the barter price would be $115 per share if the transaction occurred instantaneously. However, if the barter transaction occurred two weeks later and the stock trading price dropped to $110, then $110 would be the barter value price. Likewise, if the stock trading price went up, then the barter price would be that higher price.

Optionally, the barter value can be based upon the current stock trading price plus or minus a certain value or percentage in step 416 in FIG. 4A and at step 511 in FIG. 5B or the barter value can range around a fluctuating trading price specified as either a value amount or a percentage of the fluctuating trading price. To do this the barterer selects a range around the fluctuating stock value as illustrated in FIG. SB at 512, 518. The range can be a value amount 514, 517 or a percentage of the fluctuating trading price 516, 519. By selecting boxes 512 or 518, the barterer selects whether the range is added to or subtracted from the fluctuating value. For example, if the range was set to plus 1 percent at step 416 (by selecting box 512 and entering 1% in box 516) and the market price for IBM stock to be bartered, at the time of the barter transaction was $115 per share, a posted barter order with a value price between $115 and $116-15 would match the barterer's order. A barterer may issue a Himmelstein Option to barter away IBM stock as low as minus 9 percent of the $115 IBM market price by checking box 518 and entering 9% at box 519 so that a posted barter order with a value price between $104.65 and $115 would match the barterer's order.

Figure 4B:
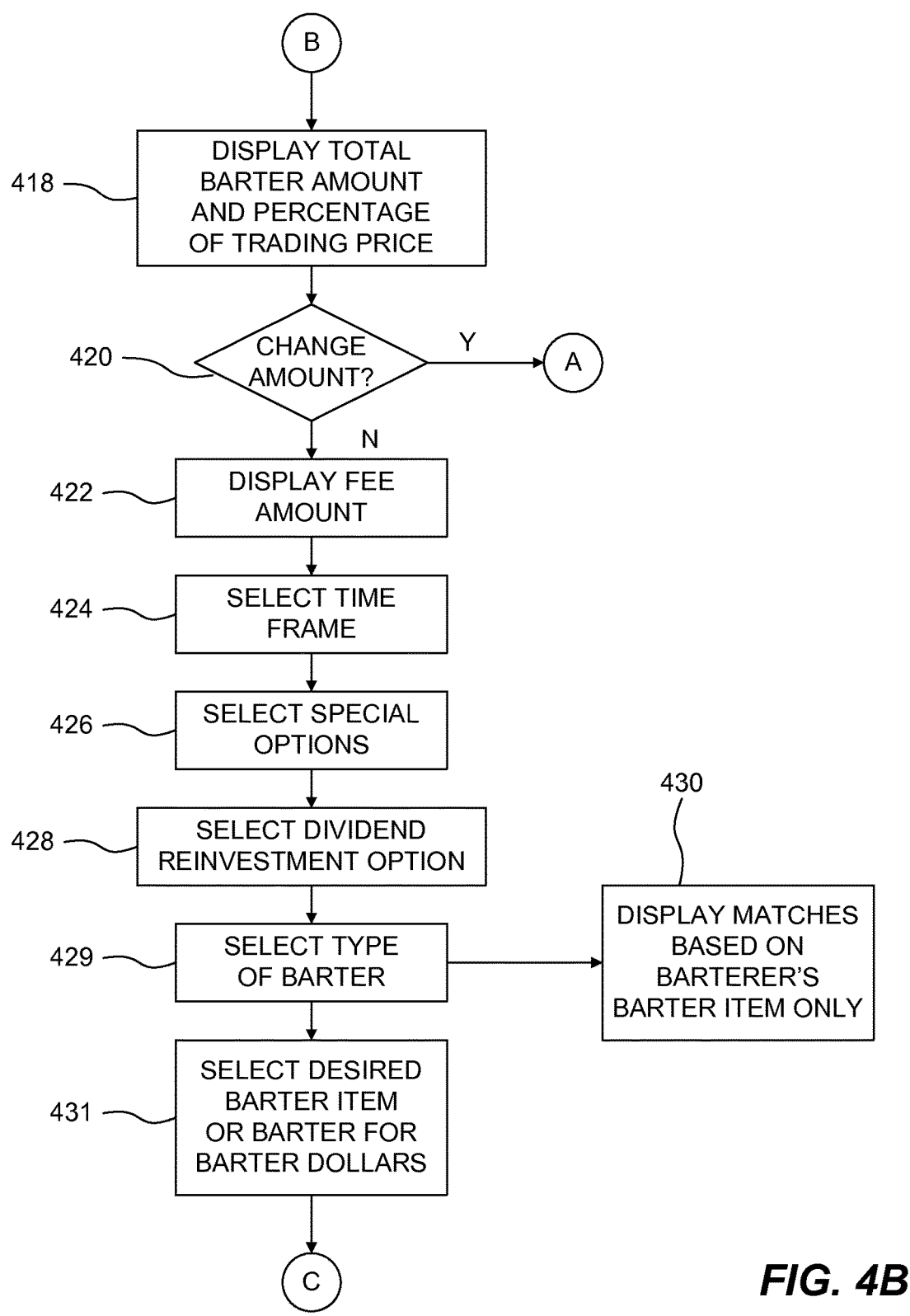

Once the value of the item to be bartered is selected in step 416 of FIG. 4A, the barter ordering module displays at step 418 of FIG. 4B the total barter amount and the percentage or dollar amount of the value price in relation to the available market price per share in FIG. 5B, at 520. Should a range of value price be selected, the display 520 is modified to reflect such. In the example of FIG. 5B, the barterer can change the barter value 520 by clicking on a "change" icon 522 and going through the appropriate steps or accept the value 520 by clicking on a "continue" icon 523. This is also shown at step 420 of FIG. 4B.

At step 422 of FIG. 4B, barter order fee amounts are displayed. Fee amounts, as illustrated in sample screen display lines 524 and 526 of FIG. 5C, are determined based on whether the barter order is to be posted to the barter order database 524 or the barter should occur with the barter website directly 526.

At step 424 of FIG. 4B, the barterer selects the time in which the barter order is valid. As illustrated in the embodiment of FIG. 5C, timing options 528 are displayed once the barter selects the down arrow. The five options are:
1) day only;
2) good until canceled;
3) fill or kill;
4) immediate or cancel; or
5) only view the current posts.

The "day only" options means that the barter order can be posted to the posted barter database only until the end of the day. Thereafter, the barter order are expunged from the posted barter order database. The "good until canceled" option means that the barter order remains posted to the posted barter order database until it is canceled by the barterer. If the "fill or kill" timing option is selected, the entire quantity must be filled or the barter order is canceled. With "fill or kill" timing, the barter order is not be added to the posted barter order database, but the database is searched for a match. Similarly, a barter order is not added to the posted barter order database if the "immediate or cancel" timing is selected. In this case, a posted barter order for only part of the barterer's quantity matches the barterer's order. The last timing option, "only view the current posts", never adds the barter order to the posted barter order database Instead, the barter matching engine 118 displays the current matches found in the posted barter order database.

At step 426 of FIG. 4B, the barterer may select special conditional parameters. The available special conditions are "minimum quantity," "do not reduce," "all or none," and "deferred settlement." The display portion 530 of FIG. 5C illustrates one means of selecting special conditions. In this embodiment, the barterer may select one of the conditions by selecting a corresponding box. If the minimum quantity condition is selected, the barterer then either adjusts the display quantity via the arrows or enters a minimum quantity value. The default minimum quantity may be set to equal the barter quantity 504. Selecting "do not reduce" means the per share value will not be reduced even if the transaction date is the stock's dividend date. If the barterer selects the "all or none" option, all barter matches must barter the entire quantity of the stock to be traded away.

Selecting the "deferred settlement" condition creates a Himmelstein Option of the item being bartered. The barterer is then required to identify open and close settlement dates, which may be the same. If the barterer is already bartering a Himmelstein Option, the barter ordering module 105 automatically selects "deferred settlement" and displays the date used by the original creator/issuer. The barterer may modify the dates as long as the modified dates are within the range of dates used by creator/issuer. Optionally, at step 531, FIG. 5C the barterer may enter a subsequent amount of the security or a different security to be provided at settlement. As hereinbefore described, the system will prompt barterer to include minimum criteria to clearly identify the security and the value.

At step 428 of FIG. 4B, if the desired security is stock, the barterer selects between three choices for the desired stock with respect to a dividend reinvestment option. Accordingly, the barterer chooses between: 1) the stock must have a dividend reinvestment program; 2) the stock must not have a dividend reinvestment program; or 3) accept new stock with or without a dividend reinvestment program. In the embodiment illustrated in FIG. 5D, the barterer selects the desired option by selecting the corresponding box in section 532.

At step 429 of FIG. 4B, the barterer chooses the type of barter they wish to transact (i.e. a direct barter only or permit the website to act as the barterer or use an intermediary if a direct barter is not available). The barterer can request a direct barter with an order from the posted barter database at a first fee rate, or in the alternative for a second fee rate, the barterer can request the website to be the barterer. The first and second fee rates may be the same or change independent of each other. At times to promote automated website bartering, depending on the securities to be bartered, the second fee rate may be set at a relatively low rate, or it may be set to a premium rate for the automated service. According to the embodiment illustrated in FIG. 5D, the barterer selects the type of transaction in section 534.

Following the selection of barter type, step 429, posted barter orders may optionally be displayed 430 based on matches of posted order "to be acquired" items with the barterer's "to be bartered item." In the case of a direct barter, a trade can be displayed immediately if a match is found in the database, or the barterer can complete and post the order to the database and await a match from a subsequent barterer. In the case of a barter with the website, the transaction is displayed immediately provided the website can buy or obtain the stock, Himmelstein Option, web barter dollars or cash desired by the barterer. Here, the website uses a predetermined formula including taking into account the relationship with the barterer to calculate the fee for this type of transaction.

The barterer selects the desired stock, Himmelstein Option, web barter dollars or cash price to acquire for the barter order at step 431 of FIG. 4B. If the barterer's desired security is a stock, Himmelstein Option, web barter dollars or cash, the barterer checks the appropriate box in display 537 as illustrated in FIG. 5D. Optionally, if the barterer's desired security is stock, the system 100 displays all stock and Himmelstein Options for the desired stock in the database, allowing the barterer to accept a Himmelstein Option in lieu of actual stock. In a manner similar to that of selecting a stock to be traded from the barterer's portfolio, stock symbols 535 are displayed upon selection of a down arrow. Optionally, the barterer can select from a list of industries 536 wherein the stock symbols 535 are filtered to list only those related to the selected industry. Alternatively, a merged alphabetical list of companies and/or stocks is shown for alphabetical searching. Additionally, the system 100 can be configured to show various companies (in a predefined sort) including the symbol and predefined financial information.

If the barterer chooses a stock or Himmelstein Option, by selecting it, the system 100 displays the symbol 535 pertaining to the chosen company. Next, in step 432 of FIG. 4C the barter ordering module informs the barterer of the available stock trading price of the desired stock/Himmelstein Option, along with the current date and time. One method of displaying the price is illustrated in FIG. 5D at section 538.

Figure 4C:
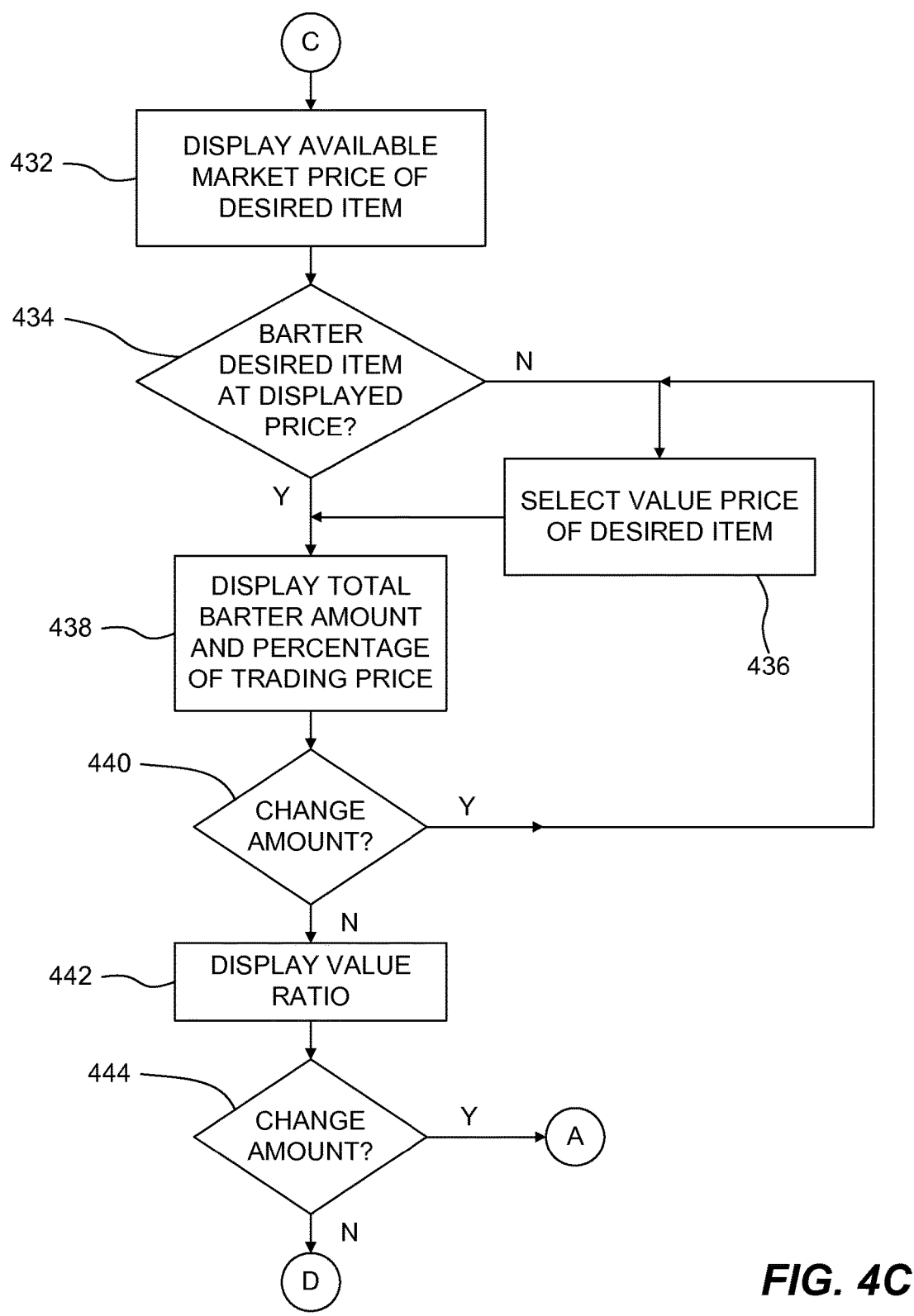
Figure 5E:
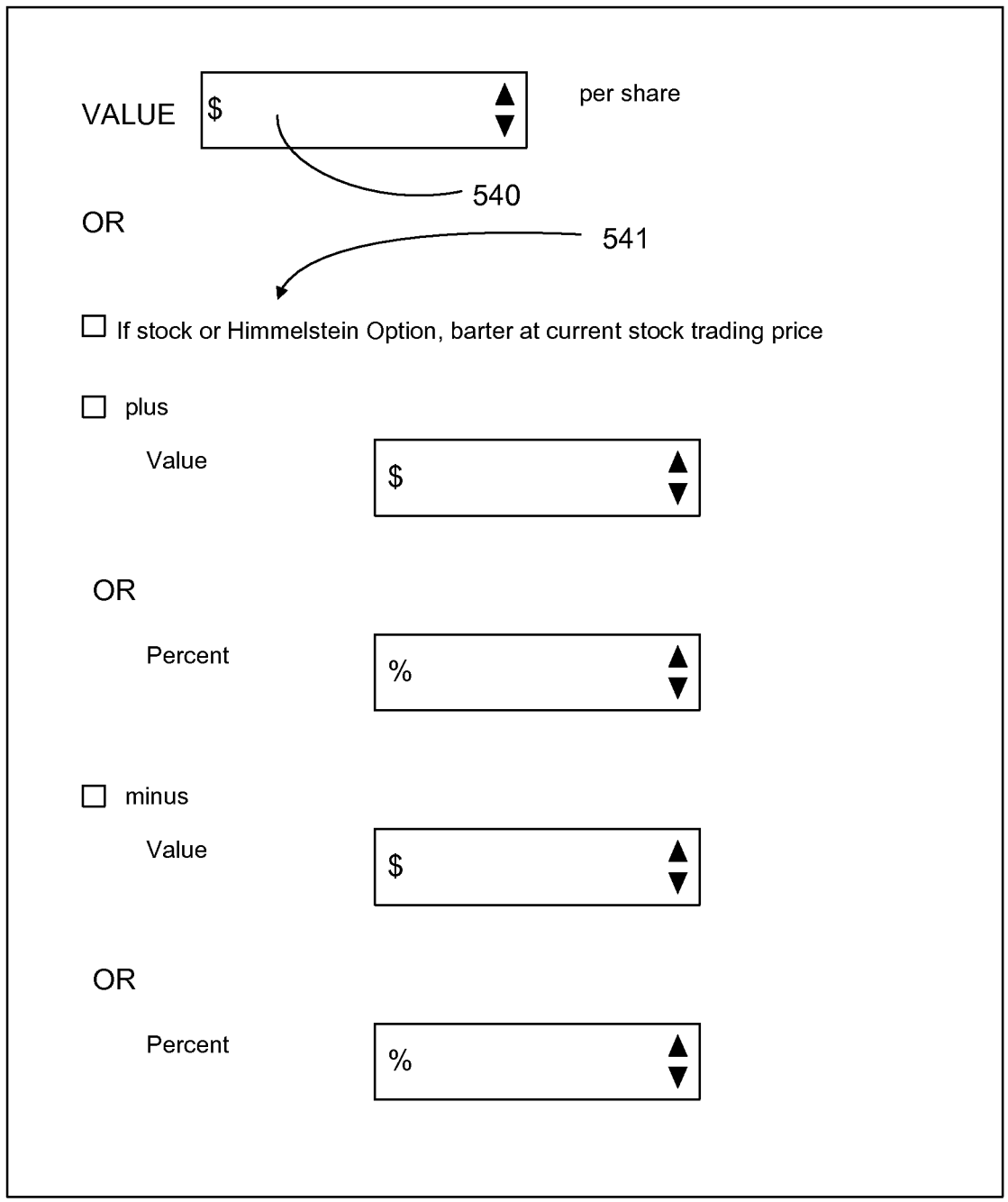

The barter value of the desired item defaults to the available stock trading price at section 540 of the display of FIG. 5E for stock, or Himmelstein Option. Further, if the system 100 had a barterer trading a stock or Himmelstein Option for cash or web barter dollars, the system 100 may prompt in 540, the stock trading price of the stock or Himmelstein Option being traded away. The barterer can accept the displayed value at step 434 or select a new value at step 436 of FIG. 4C. In the display of FIG. 5E, the desired stock value for stock or Himmelstein Option can be selected similar to that of selecting the stock value to be traded. The barterer can select a fixed value using box 540 or a value plus or minus the stock trading price (similar to step 511, as shown in FIG. 5B) or a fluctuating stock value range in section 541 in a manner as described in connection with 510-519 of FIG. 5B. The stock value can range around a fluctuating trading price specified as either a value amount or a percentage of the fluctuating trading price. Thereafter, as indicated in the flowchart of FIG. 4C at step 438, the total desired barter amount and percentage or dollar amount to the stock trading price is displayed as illustrated in sample display 542 of FIG. 5F. At step 440 of FIG. 4C, the barterer can change the barter value of the desired item which steps can be implemented by clicking the "change" icon of display section 542 of FIG. 5F.

Figure 5F:
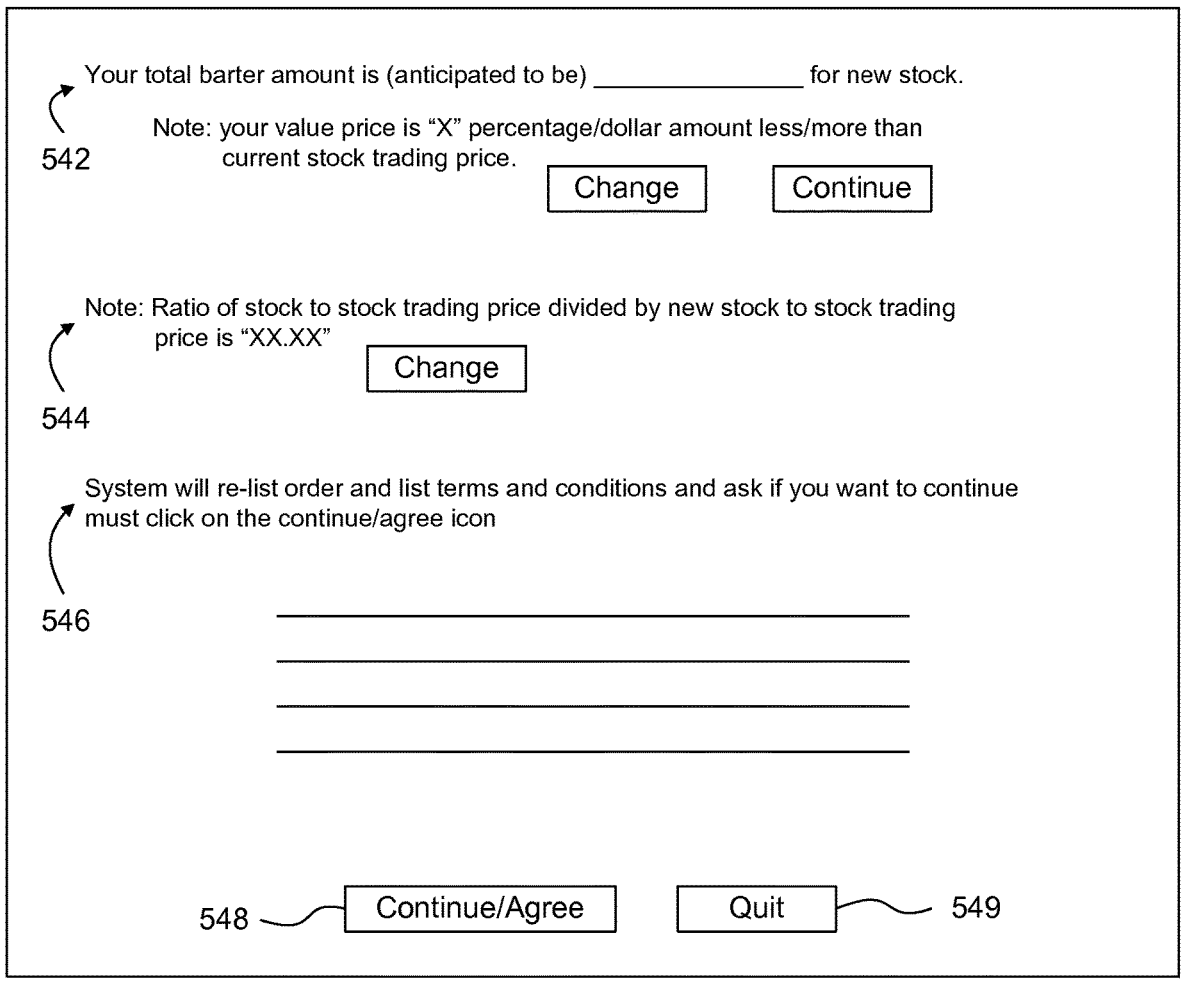

At step 442 of FIG. 4C, the systems and methods of the present application assists the barterer in determining whether the barter order is financially advantageous to the barterer. Several ratio formulas, termed Himmelstein Value Ratios, are provided to assist the barterer. In the embodiment of FIG. 5F at section 544, the barter ordering module selects the specific formula and the Himmelstein Value Ratio is displayed. The barterer may then change the barter order per step 444 by selecting a change icon in section 544 of the display FIG. 5F.

In an alternative embodiment, the barterer selects the desired formula after receiving help text describing the formulas. Regardless of the method used to select a particular formula, there are three preferred formulas:

$(x/y)/(a/b)$  Value Ratio 1)

$(a/b)/(x/y)$  Value Ratio 2)

$(b/a)-(y/x)$  Value Ratio 3)

where:
- a) a=value price for security/Himmelstein Option desired to trade away
- b) b=current security trading price for security/Himmelstein Option desired to trade away
- c) x=value price for security/Himmelstein Option desired to obtain
- d) y=current security trading price for security/Himmelstein Option desired to obtain For example, using Himmelstein Value Ratio 2, a barterer owning Coke stock or Coke Himmelstein Option is willing to barter it away at a value of $65 per share, and Coke is currently trading at $67 on the stock market. If the barterer desires to barter for IBM stock, or IBM Himmelstein Option at value of $110 per share and the stock is currently trading at $115 per share on the stock market, the value ratio formula is: $((65/67)/(110/115))=1.014$, which means that if the barterer trading Coke stock/Coke Himmelstein Option for IBM stock/IBM Himmelstein Option chose to complete the transaction, they will gain 1.4 percent. In essence, in this formula anything less than 1 is a stock/Himmelstein Option barter transaction that loses value and anything greater than 1 is a transaction that gains value. This formula is important to understand the relationship between the value of the stock/Himmelstein Option that is being traded away and the stock/Himmelstein Option that is being obtained. In lieu of displaying the value ratio, the system 100 may display the actual percentage of increase or decrease after interpreting the value ratio Variations of the above formulas may also be used. Any Himmelstein Value Ratio formula may be modified by adding or subtracting a predetermined value or variable. For example, Formula $(a/b)/(x/y)$ may be changed to have the value "−1" subtracted to it making the new Formula $(a/b)/(x/y)-1$. If Himmelstein value formula $(a/b)/(x/y)-1$ is greater than 0.00 then to what extent greater is the percentage of profit, which in the above COKE/IBM example is 1.4%. Any Himmelstein Value Ratio formula may be modified by multiplying or dividing a predetermined value or variable. For example, formula $(a/b)/(x/y)$ may be changed to have the variable "y/x" multiplied to it making the new formula $(a/b)*(y/x)$ or $(y/x)*(a/b)$. If Himmelstein value formula $(a/b*y/x)$ is greater than 1.00 then to what extent greater is the percentage of profit, which in the above COKE/IBM example is 1.4%. Any Himmelstein Value Ratio formula may be modified by having both a predetermined value or variable added or subtracted while at the same time multiplying or dividing by another predetermined value or variable. For example, formula $(b/a)-(y/x)$ may be changed to have the value of "1" added to it and have the variable "1" multiplied to it making the new Formula $((-b/a)+(y/x))-1$ or $((y/x)-(b/a))-1$. If Himmelstein value formula $((y/x)-(b/a))-1$ is greater than −1.00 then to what extent greater is the percentage of profit, which in the above COKE/IBM example is 1.4%.

For securities such as CD's, bonds, annuities and government bonds that provide an interest rate/current yield until a due/maturity date, the system may calculate the actual income from that present day forward to be earned, factoring in the type of interest and adding same to all applicable variables (i.e. b or y) in the above stated formulas. For the securities stated above, the barter order module may require the settlement date to be the same date as the due/maturity date. In other words, the variables in the above formulas would be defined as:
 a) a=value price for security/Himmelstein Option desired to trade away.
 b) b=current security trading price for security/Himmelstein Option desired to trade away, plus future interest income from that present day forward to be earned, but not paid, before the earliest settlement date of the securities being bartered
 c) x=value price for security/Himmelstein Option desired to obtain.
 d) y=current security trading price for security/Himmelstein Option desired to obtain, plus future interest income from that present day forward to be earned, but not paid, before the earliest settlement date of the securities being bartered.

For barter items or securities such as CD's that do not have a current trading market, the system 100 can also calculate the accrued, not paid, interest from issuance up to the present day. In other words, the variables b and y in the above formulas in such instances are modified as follows:
 b=system calculated security trading price for security/Himmelstein Option desired to trade away includes the following:
  original purchase price or face value of barter item or security plus.
  accrued unpaid interest income from issuance up to the present day plus,
  future interest income from that present day forward to be earned, but not paid, before the earliest settlement date of the securities being bartered.
 y=system calculated security trading price for security/Himmelstein Option desired to obtain includes the following:
  original purchase price or face value of barter item or security plus,
  accrued unpaid interest income, from issuance up to the present day plus,
  future interest income from that present day forward to be earned, but not paid, before the earliest settlement date of the securities being bartered.

Optionally, for securities such as CD's that do not have a current trading value, the system 100 may have the applicable variables (i.e. b or y) include the original purchase price or face value plus accrued interest income, excluding future interest income so that the system provides a "current day" value. The barterer may select the desired formula, including the definitions of b and/or y for each security in a barter transaction after receiving help text describing how each variable may optionally be defined in the formulas.

If the securities being bartered have different due/maturity dates, the system 100 may use the present day to the earliest settlement date as the period of time for calculating the income to be earned, calculating each securities' actual interest rate/current yield, factoring the type of interest, and adding same to the respective variables (i.e. b or y). To ascertain a more accurate value ratio, when one security has interest income, such as CD's, and another security does not, such as stock, the system may include or exclude interest income from the value ratio formulas depending on the formula chosen by barterer/system. The system 100 may disclose and or incorporate the actual formula (s) used to ascertain the value ratio into a finalized transaction agreement.

Where no conventional market value is available, the system 100 may be configured to examine posted barter orders or develop methods or new formulas to determine a current trading price.

Figure 4D:
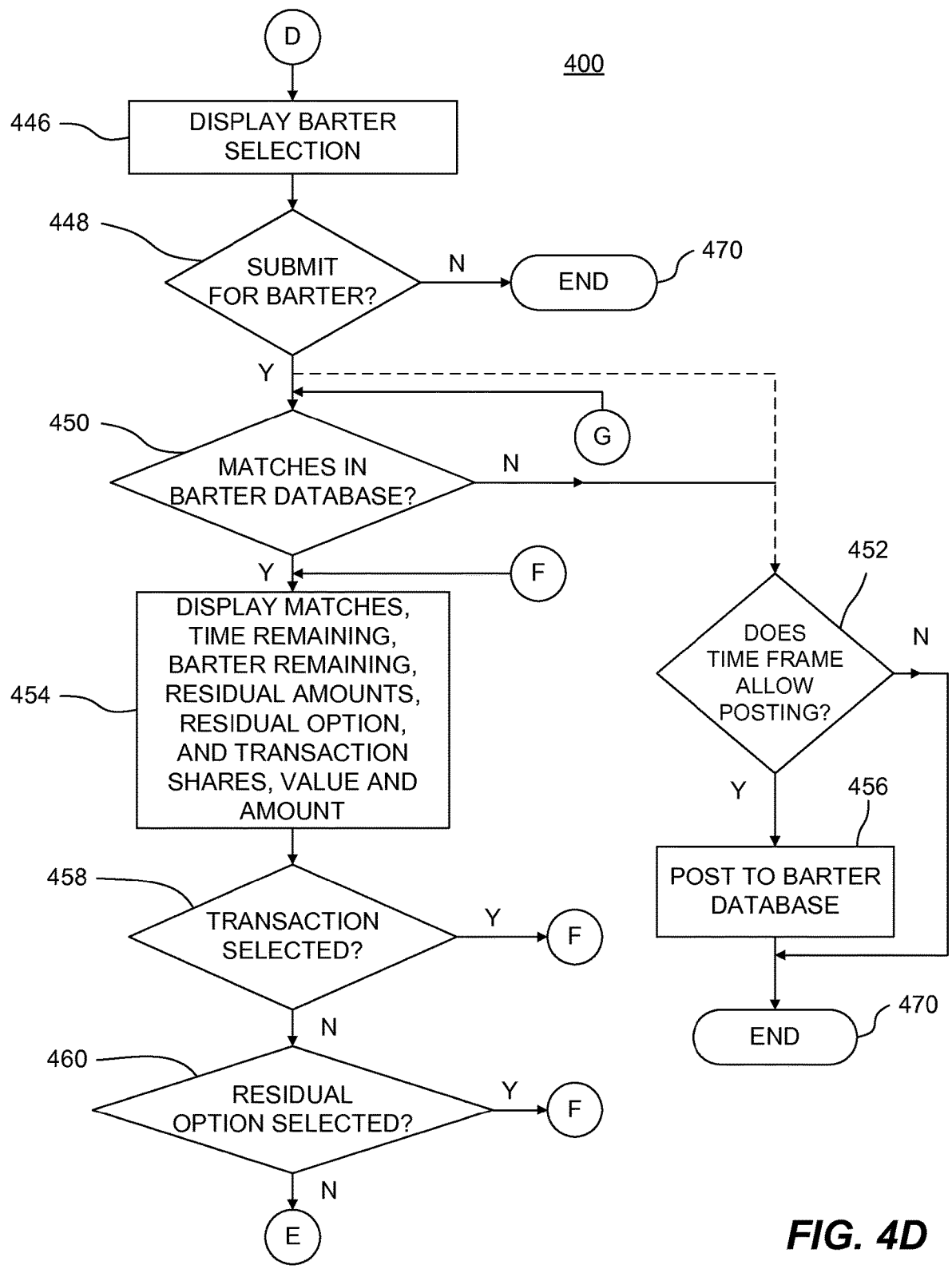

Referring to FIG. 4D at step 446, the barterer can review the barter order prior to submission of the order to the barter matching engine. As illustrated in the embodiment of FIG. 5F the barter order module lists at section 546 the terms and conditions before the barterer submits the order by clicking an appropriate icon 548. Alternatively, the barterer may decide to terminate the barter order creation by clicking a "QUIT" icon 549.

Once the order is submitted by the barterer at step 448 of FIG. 4D, the matching engine searches the website database for a barter order or in an embodiment where the engine matches multi-order barters, multiple barter orders to satisfy the submitted order. If no match is found at step 450, the barter matching engine determines whether the order should be posted to the database 452 based on the timing selected at step 424 of FIG. 4B. If the order should be posted, the barter order database module 116 posts the order to the database.

After the barterer clicks on the "continue/agree" icon 548, (and depending on the timing chosen), the system 100 in accordance with FIG. 4D posts the barter as an available transaction 452, 456 and/or finds and displays "matching" posted barter orders 450, 454 via the screen display illustrated in FIG. 6. The "matching" in the preferred embodiment includes matching the barterer's desired item and barter items with the barter and desired items of single or multiple combinations of posted barter orders where any matched Himmelstein options have overlapping settlement dates.

Where posted barter orders are displayed, preferably the barter orders are listed by the lowest share price of the stock or Himmelstein option that the barterer wishes to acquire such as in display section 610 of FIG. 6. If any one of the available barter orders requires the price to fluctuate with the stock market, the display is preferably continually updated so that the prices reflect market value as close to real time as possible. The screen also displays the order number, symbol, share price, ratio to stock trading price, value ratio, number of shares, barter amount, barter price fluctuate with stock trading price, special conditions, timing, and dividend reinvestment criteria.

If the individual decides that they are willing to barter away some or all of their selected portfolio stock/Himmelstein option for one or more barter orders listed, they select to do so 458, of FIG. 4D (or as long as they have more barter amount available) by simply clicking on each order, (i.e. choosing first preference then second preference, and so on). Each time an order is chosen, the system 100 permits/requires the individual to revise their original quantity, and value price in the stock/Himmelstein option for which they desire to trade away in the barter, thereby requiring the individual to accept the prices and the amount of stock/Himmelstein option received in return from the barter order that they had selected. When a posted order is chosen, the system 100 enters the corresponding information in a table on the screen to notify the individual of the transaction number, number of "shares trading away" with item price, number of "shares receiving" with item price and barter amount with totals at bottom of the table as reflected in screen table 620 of FIG. 6. For cash and web barter dollars, the fields which are not applicable remain blank. Optimally, the system may display in 620, the after date and before date for Himmelstein Options being acquired or bartered.

Each time a transaction is chosen, the system 100 reduces the value for "amount of barter left" in a display box 622. If an individual has less than an available barter transaction, (with no special conditions nor timing limitations) when the individual selects the order number, the system 100 shows the number of shares for which the barter is permitted. Upon selecting each order, the system 100 shows the residual amount in a display box 624 and presents three choices 460: 1) hold stock/Himmelstein option in escrow; 2) donate the stock/Himmelstein option; and 3) purchase other stock/Himmelstein option. If any of these choices are chosen, the system 100 displays additional screens to complete the above tasks. Optionally, the system 100 may allow the barterer to convert the residual amount into web dollars which are added to the barterer's portfolio after the transaction is completed.

Additionally, when a barter order is chosen, the system 100 "locks" the barter order, including the price, to the individual for a predetermined duration. A display of the time remaining to complete the transaction appears in a "time remaining" display box 626. Should the time expire, the system 100 provides two options: 1) finalize transaction; 2) or lose transaction in "X" seconds, with seconds decrementing on screen. The system 100 may, if desired, inform the individual that someone else is looking at the same barter order and may inform other users that there are pending barter orders which may come available.

Figure 4E:
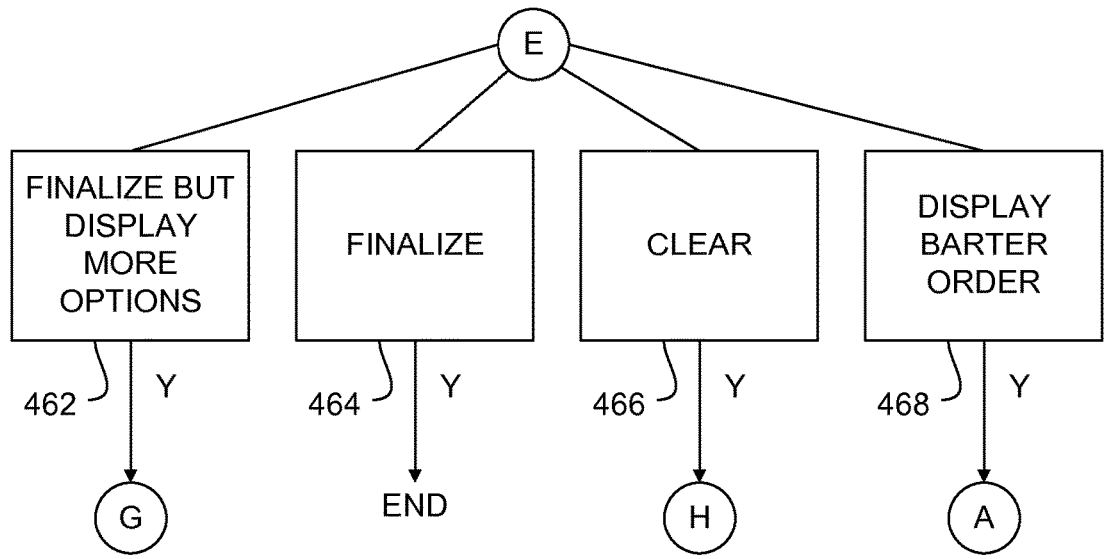

Upon the individual reviewing available barter orders and deciding what they want to do, (i.e. accept one or more orders or none), they proceed by choosing one of the following four icons 631-634: 1) clear; 2) change barter order; 3) finalize transaction; and 4) finalize transaction but display more barter options. Each option leads to the display of additional screens to complete the selected task as indicated in FIG. 4E.

In addition to the main bartering screens, the system 100 may include pop-up screens to show "history" of past barter transactions and to show performance on how a security is performing, and the current value ratio formula provided from past transaction(s). If an individual bartered away Himmelstein Option(s) that have not gone to settlement, the system provides a screen selection showing the security or securities, the range of settlement dates allowed and preferably includes all of the criteria or information in the actual barter transaction.

The system 100 exhibits other special conditions such as if the value of a security falls, the system 100 may require barterers to barter some or all of a security back; an election to require that the value ratio must stay within a specified range for a specified time or trigger an action by the system 100 such as a penalty, or forcing the individuals switch some or all security back, etc.; and the entry of multiple securities or symbols, and corresponding value prices, and permit the system 100 to automatically take the best value ratio as long as value ratio is over a specific number (i.e. such as 1.00) set by the barterer and the system 100 automatically completes the transaction if posted barter orders exist meeting that criteria.

The system 100 may be programmed to automatically purchase security within a predetermined value range when a barter order is posted or market values change, complete a barter transaction for the barter order and sell the acquired security while charging an appropriate fee. The system 100 may act as a negotiator between barterers, sending each an e-mail or otherwise notifying them when the search engine discovers potential matches among barter orders. The system 100 may permit access by individual barterers to the identity of barterers who have posted "matching" barter orders to allow them to negotiate directly between themselves through e-mail or otherwise. The system 100 may require e-mail sent through it to purge "identity" (i.e. ensure anonymity). The system 100 may create an e-mail subsystem allowing individuals interesting in bartering to enter limited pertinent information into the blanks of the agreement being presented to one another only identifying the individuals by the order number that was created by the system 100 when it originally posted the barter order. This is referred to as an "offer to purchase." The system 100 may lock the individual's security being offered for a specified time allowing the individual receiving the offer time to accept, modify, or reject the offer. In other words, the individual making the offer cannot back out unless the person receiving it fails to respond within the time frame, modifies it or rejects it.

The system 100 can also be configured for telephone access so that all functions that one may do online may be done over the telephone. Additionally, pre-approved individuals can be permitted to barter for securities (which the website holds in escrow) prior to bartering their own securities.

In the generalized version of the barter system, various types of barters may be implemented as schematically illustrated in FIGS. 7A through 7E.

Figure 7A:
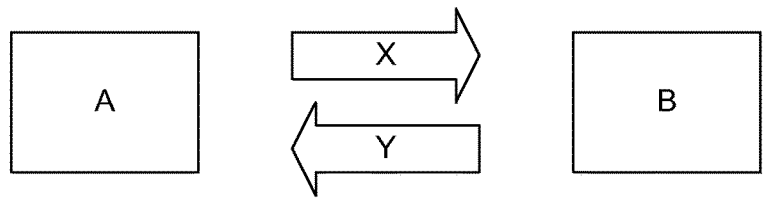
FIGS. 7A-7E are schematic illustrations of several different types of barter transactions which may be implemented according to the teachings of the present application.

Referring to FIG. 7A, a two party exchange or direct barter is illustrated. For example, Individual "A" barters directly with Individual "B" effecting an exchange of securities, X and Y respectively. Example, Individual "A" issues or posts a Himmelstein Option to barter 100 shares of AOL worth $1,000 (Stock "X") for 200 shares of IBM worth $1,000 (Stock "y") after Jan. 1, 2000 and before Feb. 1, 2005, Individual "B" accepts the Himmelstein Option effectuating an agreement to immediately barter 200 shares of IBM for the rights to acquire 100 shares of AOL, in the future. A receives the 200 shares of IBM from B and irrevocably commits A's 100 shares of AOL to be transferred to B or B's designee at any time settlement is demanded between Jan. 1, 2000 and Feb. 1, 2005.

In the event the barter transaction is not an exact match in value, the system 100 may balance the barter transaction by allowing one barterer or the other to pay cash, provide web barter dollars, offer a different security, such as a Himmelstein Option on a different security, or allow the barterer to acquire more of the particular security that they are bartering.

Figure 7B:
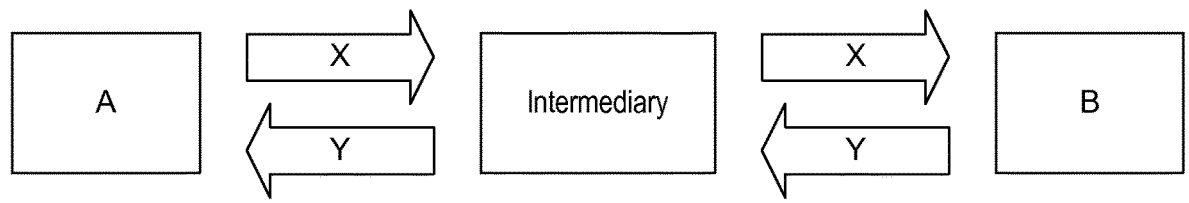

Referring to FIG. 7B, a two party exchange with an intermediary is illustrated. For example, Individual "A" barters with Individual "B" to trade away security X and acquire security Y through an intermediary. If a match is located but the values are not equal, the intermediary may retain the excess security and supplement the barterer bartering away the greater value security with cash, provide web barter dollars, a different security, such as a Himmelstein Option on a different security, or acquire more of the desired security (by first acquiring such).

The intermediary either obtains additional cash, a security, such as a Himmelstein Option, or more of the desired security, such as a Himmelstein Option from the other barterer and/or from a third party (upon which the intermediary reciprocates a security, such as a Himmelstein Option, cash, or web barter dollars). For example, using the same values above, Individual "A" issues or posts a Himmelstein Option to barter 100 shares of AOL for 200 shares of IBM. Individual "B" has 100 shares of IBM that he would like to barter for the rights to acquire 50 shares of AOL in the future. The intermediary keeps the Himmelstein Option for 50 shares of AOL and acquires the additional 100 shares of IBM and completes the exchange with individual A.

Figure 7C:
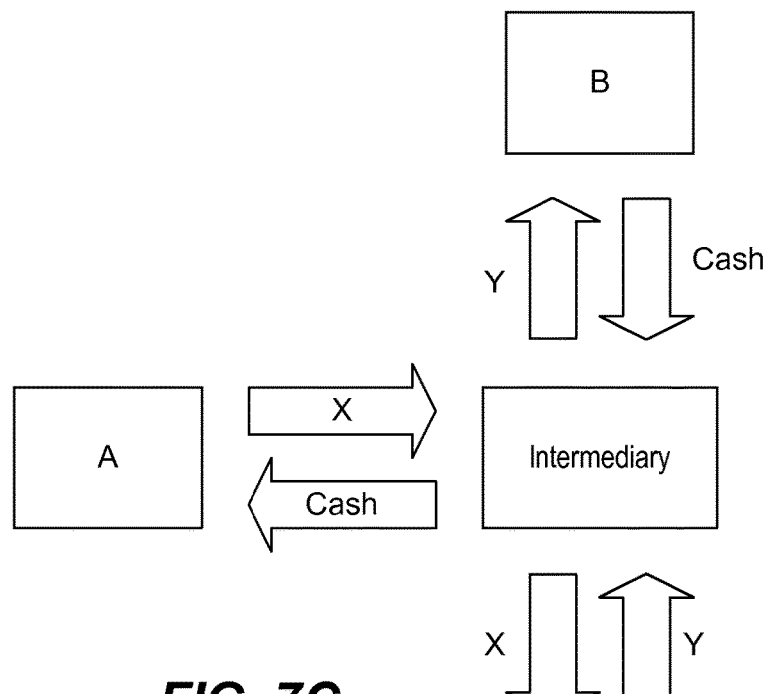

FIG. 7C illustrates a three party transaction with an intermediary. Individual "C" barters away security Y to receive security X. The intermediary, which may be the barter website, identifies Individuals "A" and "B" to complete the transaction. Individual A sells or barters security X for cash and Individual B buys or barters security Y for cash. The cash amounts may or may not be equal, but Individuals A, B and C may incur a service charge from the intermediary/website for the service provided. In lieu of cash, web dollar credits are preferred where the website acts as intermediary. In another embodiment, the system 100 may allow the barterers to barter away their securities or financial interest at a different time than when they receive a security or financial interest. This is a "Deferred Exchange."

Figure 7D:
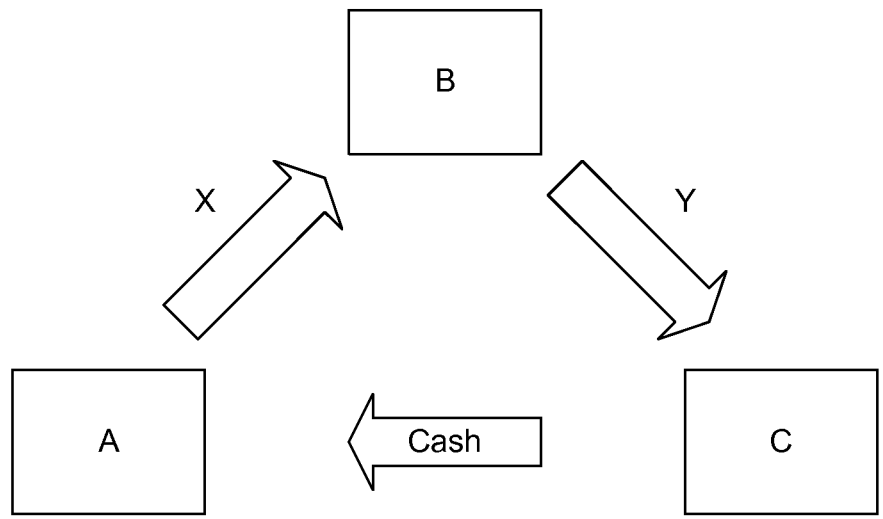

FIG. 7D illustrates a three party transaction without an intermediary. In this example, barterer "A" receives cash for security or financial interest X. Barterer "B" receives security or financial interest X in exchange for security or financial interest Y. Barterer "C" receives security or financial interest Y for the cash which is received by barterer A.

Figure 7E:
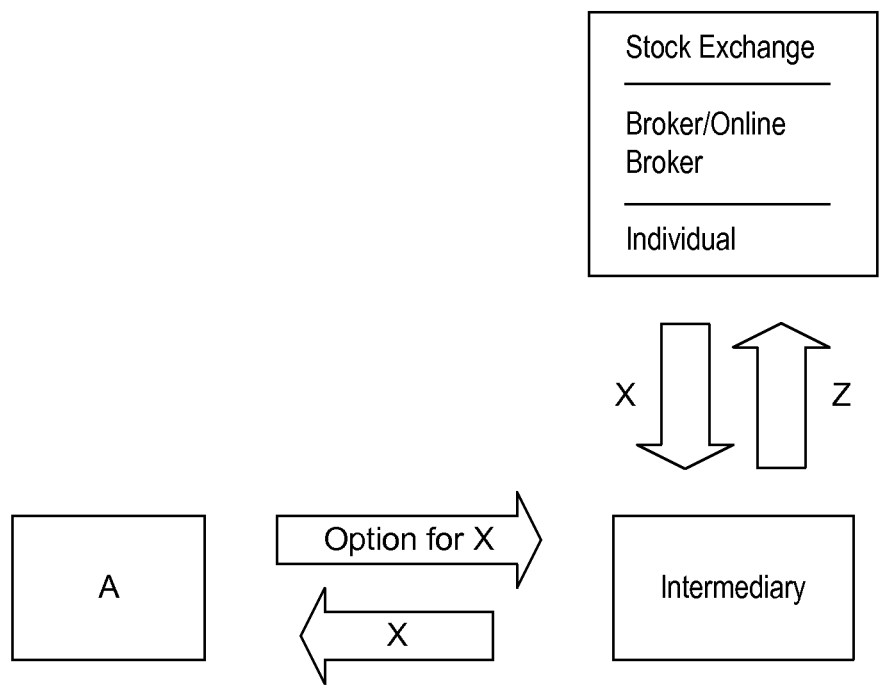

FIG. 7E illustrates a two party exchange with an intermediary. Barterer "A" wants to exercise a Himmelstein Option (i.e. have settlement and take title) to own the security in the Himmelstein Option. In this illustration, the system 100 may require in the Agreement that to exercise the Himmelstein Option, the barterer must do so through the system 100. Barterer A trades the Himmelstein Option on financial interest X for the actual interest X to the intermediary. The intermediary acquires the interest X from source B in exchange for consideration Z. The intermediary then maintains Himmelstein Option for X in its own portfolio for future bartering. Z may be web dollars or some other security or interest acquired by the website in a similar manner. Alternatively, if the value of Z is more than the Himmelstein Option for X, the system 100 allows Barter "A" to exercise the Himmelstein Option (i.e. have the settlement on security X).

Where the system 100 or a designated entity acts as an intermediary, a barterer can create a barter order that does not require a security at the same time it barters away its own security. For example, an individual may allow their security to be bartered for an interest of equal value which the barterer can identify at a later time. The understanding being that the barterer can defer the completion of the transaction by the website or a designated entity acting as intermediary. If another barterer accepted the barter order terms, the funds for the transaction are immediately placed in an escrow account. For example, if the current tax law permitted, the system 100 would allow "X" number of days to choose a particular security and "X" number of additional days to actually acquire the new security. Therefore, the website or a designated entity may hold the securities in escrow as a third party. The website or a designated entity may, upon being directed by the barterer who has funds in escrow, acquire a specific security to complete the barter. In this embodiment, the system 100 may continually update the barterer with respect to the security such as stocks (re: stocks that the individual informed the system that they were interested in) with respect to the current "closest" matches for a specific stock or range of stocks that exist in the database system, based on the value ratio formula (s) that were previously defined herein. This can be done by either e-mail, phone, or when the barterer accesses the website. While online, the system 100 may continually update the closest matches, thereby permitting an individual to either ignore, choose one, or choose multiple ones. If the individual chooses a match or several matches, with excess remaining funds, these excess funds are held in escrow.

The system 100 may be configured to only barter Himmelstein Options or the future rights. Reiterating, a Himmelstein Option is an agreement given by the individual that owns the barter item or security, an irrevocable right to another party that after a specific date and before a specified date, this party has the right to "go to settlement" and acquire the barter item or security. Further, the Himmelstein Option allows the party in possession or any party currently in possession to barter said Himmelstein Option, i.e. transfer said rights for settlement. Barter order parameters then include an "after date" upon which a Himmelstein Option may be exercised and an "expiration date" that the Himmelstein Option expires. The expiration date may be an indefinite date. For example, barterers may do this to diversify their portfolios where they do not have the right to sell a security immediately, (such as via a preexisting agreement with an employer company). If the security is unregistered, the system can, after the holding period, directly process the stock with a designated transfer agent in order for it to be allowed to be transferred, i.e. go to settlement. In this instance, only Himmelstein Options are able to be immediately bartered since the barterer cannot transfer the security until after a specific date.

The Himmelstein Option value and security value may be different, and usually would be different if the Himmelstein Option expiration date is a specified date and not open or "indefinite". Both dates and values are preferably displayed for matching barter orders in a manner similar to the display of FIG. 6

Acting as an intermediary, the system 100 can hold a barter item or security in a trust account if, or until, someone exercises a Himmelstein Option to acquire it. A barterer posting a Himmelstein Option barter order chooses the after and expiration date which date(s) must be within the terms of their Himmelstein Option if they are not the actual owner of the security. The system 100 may prompt the expiration date as "indefinite", with the barterer who is creating the Himmelstein Option away having the ability to modify the Himmelstein Option barter order with a specific date. The value of the "Himmelstein Option" is worth less if there is an expiration date, at which time the Himmelstein Option no longer exists. If the barter item or security subject to the Himmelstein Option is held in trust by the system 100, the system returns the item or security upon expiration date to the barterer who had offered the Himmelstein Option or the party who settled the Himmelstein Option and obtained "title." The purpose of the system 100 holding the security "in escrow", or in trust, is to ensure that a barterer acquiring a Himmelstein Option has a complete assurance that their right of ownership is "guaranteed" should they exercise it at a future date. The system 100 has the ability, (if it were a security such as stock or a mutual fund), to include or exclude the dividends, long term gains and losses and short term gains and losses. If the dividends, long term gains and losses, and short term gains and losses were included, at the end of each tax year, the 1099-DIV and gains and losses issued may be transferred to the system 100 as the "nominee" which may in turn, make the "nominee" the individual who had obtained the Himmelstein Option or the rights of ownership to the security.

Himmelstein Options having an "after date" and an "expiration date" when settlement can occur has a number of benefits for individual barterers. A barterer bartering away securities can ensure that a sale occurs after the barterer has owned the security more than one year so that any income is taxed at capital gains rate instead of ordinary income rate. If a barter works for a company that requires them not to sell the security for a specific time period, but the barterer wants to diversify their portfolio, the system 100 allows them to do so.

The system 100 has other advantages. For example, incorporating the security stock into a Himmelstein Option that is bartered removes uncertainty (i.e. future risk). This is beneficial in many instances. For example, successful, educated investors desiring to decrease their stock portfolio can recognize this benefit and utilize the Himmelstein Option to reduce their stock portfolio in a controlled manner.

Since the system 100 allows securities, such as CD's to be incorporated into a Himmelstein Option, if one wanted to become liquid prior to maturity, one can barter away a Himmelstein Option on the CD in lieu of incurring a penalty for early redemption. The net value of the Himmelstein Option issued is logically set by the barterer to be less than the penalty.

The system 100 is preferably configured to internally track all individual rights when acting as an intermediary or escrow. If a barterer wants to "cash out", the system may permit them to barter their securities including a Himmelstein Option away for cash, or alternatively require them to exercise their Himmelstein Option and then sell their securities that they acquired.

For tax purposes, the system 100 can require a barterer to transfer with the security their estate exemption (or a portion thereof) up to the allowed estate exemption amount (which is currently $625,000) as a gift. In this case, the barterer is not entitled to this at death. When that individual receives a security in return, the individuals from whom the security came would also have given an estate exemption. Also, the system 100 can be configured to utilize the gift tax exemption. In essence, allowing a barterer to gift up to the maximum non-taxable amount, which is currently $10,000, to each and every individual that they barter with at which time they receive the same amount back in the security such as cash as "a gift". This requires all gift transactions to be less than or equal to $10,000.

If Section 1031 of the Internal Revenue Code of 1986 is amended to include securities as defined earlier, the present system can be configured to effectuate a tax deferred exchange should one or both bartering parties desire such. Further, the system 100 can be adapted, modified or changed to utilize or capitalize on any existing or future tax laws.

Per the S.E.C., barter transactions or transfer of rights are not registered. Thus, this system permits bartering in a discrete and/or anonymous manner, (i.e., not informing the public). However, the system 100 is preferably configured to compile historical barter information regarding barter transactions of each barter. Additionally, the system 100 may be modified to meet S.E.C. regulations, if required. Terms and Conditions in a Himmelstein Option can include contingencies for settlement. For example, a Himmelstein Option may be bartered with a contingency that for settlement it must meet SEC approval.

The present system permits any type of securities or financial interests to be bartered, including but not limited to CD's, stocks, bonds, notes, evidences of indebtedness or interest, interests in a partnership, certificate of trust or beneficial interest, etc. The system 100 can interface with or be incorporated as part of online companies in such a fashion that it is transparent to the clients of the online trading company. When a client from an online trading company desires to purchase a particular security, the online trading company may choose to acquire, if available, from another individual who has entered a transaction to barter their security away. The online trading company can act as the intermediary and barter for the security, in essence making the online trading company the system 100 barterer with the ability to acquire new stock and/or any security, and then sell it to their online client. By doing this, the online company can keep the entire spread between the "ask and bid" with no commissions, and undercuts traditional stock exchanges in price and speed by eliminating intermediaries such as floor brokers or specialists from the trading process.

The system 100 can be configured to handle "exchange funds" often known as "swap funds" or (Private Placement Memorandum) P.P.M. wherein an individual puts in their financial interests or security (such as stock shares) into the fund for exchange units of the entire fund. This allows the individual to diversify their financial interests or securities such as stock holdings without having to pay capital-gains taxes. In such a case, the system 100 maintains "system" funds and barterers exchange various financial interests for units of the "system" find. The system 100 can also be configured to further open and close new finds when deemed necessary by the system or by preset parameters.

The system 100 can allow barter orders to require only some security up front at the time of the Himmelstein Option Agreement being consummated. This portion of the security or commodity may or may not be refundable. The balance of the Agreement would only be paid if the Himmelstein Option is finalized, or ownership of the security is transferred.

For example, a posted transaction can state that the Hinmelstein Option must occur after Jan. 5, 2000 and before Jan. 6, 2000 and the barterer is bartering AOL stock for cash or web barter dollars for $5.00 per share paid immediately which is non-refundable and $95.00 per share at settlement. Individuals accepting this Himmelstein Option must pay the $5.00 per share which is non-refundable. On Jan. 6, 2000 if the AOL stock is less than $95.00 per share, the individual will choose not to exercise their rights in the Agreement, thereby allowing the Agreement to expire. This is to be defined as selling long, in the "virtual stock market", (i.e., system 100).

In an alternative embodiment, the system 100 may allow a barterer to issue a Himmelstein Option on a security that the barterer does not own, nor have a Himmelstein Option (i.e. rights to own). If, or when, the Himmelstein Option is chosen (for example, by person "A") the barterer is required to acquire the security or the Himmelstein Option that was being traded away, on or before the date after the barter transaction may occur, to then hand it over to person "A". This is to be defined as selling short or trading futures in the "virtual stock market" (i.e. system 100).

The virtual market (i.e. system 100) can handle what is referred to in the financial industry as a margin account wherein the system 100 allows the barterer to borrow web barter dollars, cash or issue Himmelstein Options against the value of their portfolio including Himmelstein Options in their possession.

When someone issues a Himmelstein Option, the barter transaction can also allow the person issuing the Himmelstein Option to enter a different before and after date for the Himmelstein Option for the new security desired. Therefore, in this embodiment, the system 100 may require the person posting the transaction for the Himmelstein Option for the security desired to give a specific date before, and a specific date after, or a range of dates that would be acceptable. This range of dates may be disclosed to potential barterers; or in the alternative, can be undisclosed (making a potential barterer be required to choose specific dates, before and after) without knowing the range of dates that the individual posting the Himmelstein Option used.

With respect to the securities that provide dividends, interest etc., the system 100 can further do the following. The system 100 may keep the dividends, interest etc., as part of the transaction, and may put in a common "pool" all dividends, interest etc. realized. A formula is used to proportion the amount between any, and all, clients holding Himmelstein Options for the specific class of items.

The system 100 can require barterers to enter Himmelstein Options or barter orders in round lots. For example, if the security was stock, the system 100 can require increments of 100 shares.

The system 100 can have the ability to break down posted order(s) into specific dollar and or quantity amount(s) allotment and re-post. For example, if the system 100 chose to break down into a specific dollar amount, the system 100 can choose one thousand dollar amount(s) or block(s). If someone posted 10 shares of IBM stock at $110.00 for each share, the system 100 can re-post to be 2 barter orders: one order to be 9 shares of IBM stock with 10 web barter dollars; and one order with 1 share of IBM stock as the residual amount. In another example, if the system 100 chose to break down into a specific quantity amount in the security "stock", the system 100 may decide to break down posted orders to allotments of 100 shares and post the remaining portion (if any) that isn't dividable by 100. For example, if the posted order was 1220 shares, the system 100 can re-post to be 13 barter orders: (12) barter orders with 100 shares and (1) barter order with 20 shares. Further, if the system 100 wanted all residual amount(s) to be a specific figure, the system 100 can require the balance of the security plus web barter dollars to always be a specific value. The purpose is to simplify the barter values to be essentially equal to a common value or multiple common values in the system 100 to facilitate more barter transactions.

As a "virtual stock market", the system may allow all securities to be in decimal format or dividable by 100, 1000 etc. This means that even a Himmelstein Option (no matter the security stated in the Himmelstein Option) can be in decimal format or dividable by 100, 1000 etc. Therefore 1.00=1 total unit of the particular security. For instance if the security is stock, 1.00 would equal one share of stock for a particular company.

Therefore, any fractional or decimal amount created from a barter transaction can be worth for example, as little as 0.001 of a web barter dollar or 0.001 of a U.S. dollar. Specifically, if Individual "A" posted a barter order to barter away 100 shares of AOL stock at $85.00 per share while desiring IBM shares at $180 per share, the system may, (if an available match existed or if it was a direct barter with the website) complete the barter order and provide 47.22 IBM shares at $180.00 per share. In this case, decimal amount of 0.22 is worth $39.60, if $180 is the current stock trading price per share. Alternatively, the system/barterer may allow, depending on the parameters set, barter 99.53 shares of AOL stock for 47 shares of IBM stock.

The system can state in all barter agreements (i.e. terms and conditions) that all parties using the system may accumulate "fractional" or "decimal" amounts (i.e. all values less than (1.00) total unit of a particular security) from different parties and upon the sum equaling 1.00, allow the sum to become 1 unit of a security, such as 1 share of stock. It should be noted that for Himmelstein Options, the system would be required to ensure the latest before dates and latest after dates overlap, and the system would restate the before date and after date to be the latest before date and earliest after date of all the fractional or decimal amounts.

Preferably, the system maintains a history knowing which fractional or decimal amount came from which security, such as stock, and can, when beneficial to the system and/or the barterer, reseparate a unit of a particular security and rematch it back together with a portion of the original security that had been part of the actually split. If for a Himmelstein Option, this may change the range of settlement dates.

Optimally, the system may allow barterers to barter fractional or decimal amounts to other barterers and/or only with the system.

The system 100 may set the standard for minimum transaction and maximum transaction based upon various concerns, including but not limited to, profitability and or irregularities, illegal trade practices and illegal trade patterns.

The methodology of the "standard" Himmelstein Option is to allow two or more parties to agree at a future date to barter, exchange or sell items or securities based on current agreed values, regardless of the trading values of the securities at the time of settlement. In an alternative embodiment, two or more parties may agree to exchange or barter at a future date based on values on that future date. In this embodiment, the settlement date or dates for each security may yet be a different date.

The system may unilaterally determine, or give each individual barterer, the ability to select a closing price for securities as trading days get longer with extended after-hours trading. For example, if a security was stock, the system may permit an individual to choose the traditional 4:00 P.M. eastern/standard time closing price of the NYSE and the NASDAQ market. On the other hand, the system or individual may choose the value based on after-hours trading. For example with the security, stock, or Himmelstein Option for stock, the system uses the closing price as the current stock trading price as noted on 538, FIG. 5D and 506, FIG. 5A.

The system 100 can operate 24 hours a day or during standard market hours and/or during predefined after hours trading or a combination thereof. The system 100 can further allow specific securities to be traded/bartered during specific time frames or allow a barterer to choose the hours during which the barterer wants their barter order posted (i.e. available for barter). Furthermore, the barterer or the system may allow the after hours trading market to operate totally independent from the standard market hours session. It may be a selectable parameter by either the barterer or system to determine whether a barter order posted during standard hours will participate in the after trading sessions and vice versa. Also, the barterer or system can determine if unexecuted barter posted orders placed in either the standard or after hours session carries over to the other session or gets canceled.

The system can ensure that barterers remain anonymous from one another and may utilize trustees, assignors or intermediaries to accomplish such.

The system can also allow any barter order to be canceled under specific terms. Further, if the order was not "locked" by a barterer or already processed, the system can permit an individual who created the barter order to cancel or modify same.

The system can also utilize the latest security features and encryption methods available.

The system may permit an individual to post a barter order with a range of quantities acceptable to the individual. For example, if the individual posted IBM stock with a range of 5-10 shares, this means that the system can accept a barter order for any quantity between 5-10 shares. This increases the likelihood of the barter transaction occurring. As will be recognized by those skilled in the art, the fee structure charged by the system may be modified to handle this embodiment.

The system 100 can also conduct or perform auctions wherein the system 100 can further require: 1) a bidder to bid with a specific security; 2) a bidder to bid with a specific list of securities pre-approved; 3) require various conditions on a bidder such as requiring security to be held by the system/designated agent; 4) pre-approve an individual to bid and 5) Minimum bid requirements may exist. The system 100 may use the embodiment that allows "offers" and allows communications between potential barterers using the system's e-mail subsystem.

An agreement for a Himmelstein Option can state various additional conditions such as requiring that the barterer in possession of or in ownership of a Himmelstein Option must first offer or sell same to the system 100 and/or owner of the security prior to going to settlement. The system may allow a barterer creating Himmelstein Options the ability to draft specific conditions to essentially create a custom contract to meet the barterer's needs.

If the system 100 utilizes an intermediary or designated agent, the system 100 has the ability to fully communicate in such fashion to ensure that all securities are transferred back and forth in a proper controlled and secure fashion.

The system can authorize and permit an individual to access the ebarterrealestate.com system and utilize an intermediary, or directly barter for real estate.

Figure 8:
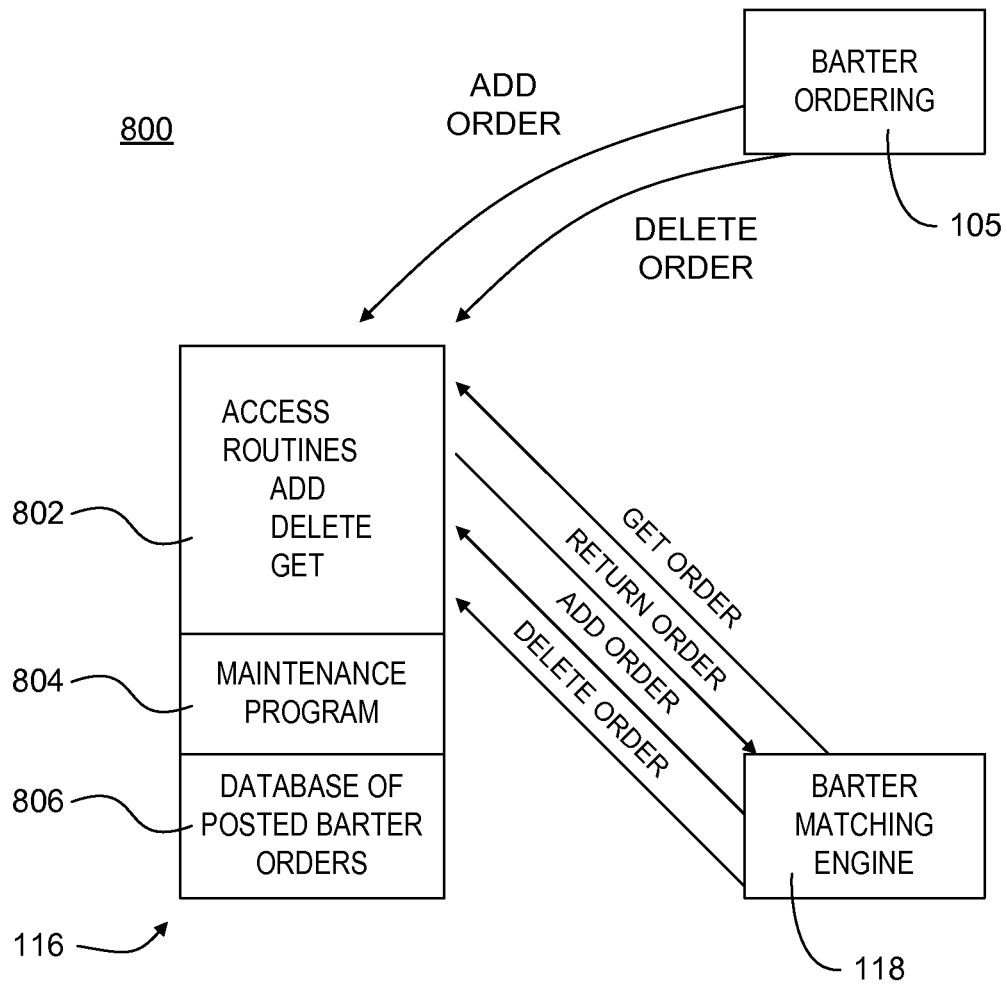
FIG. 8 is a schematic diagram of the components of a barter posting module in accordance with the teachings of the present application.

Referring now to FIG. 8, the posted barter order database module 116 stores posted barter orders 806. provides access routines 802 and performs maintenance of the database 804. Among the access routines 802 are add order record, delete order record and get order record.

The add order routine generates a database record that comprises the barter order in addition to a unique transaction number, the time and date stamp of the order and the account number. There are numerous delete routines to remove posted barter orders based on different criteria. Some of the criteria are account number, transaction number, time and date, and barter item. Similarly, the get routine can return records based on the same criteria.

The maintenance program 804 executes periodically, or optionally at the request of and access routine 802, to remove and modify posted barter orders. For example, orders may be modified if a stock split occurs and the barter order designates this stock or a Himmelstein Option for the stock. Orders can be removed for a number of reasons such as the barter order expires, the barter account closes or the barter item is no longer available. For example, a barter order can be removed if stock trading is halted and the barter order designates this stock.

Barter orders are modified by the maintenance program 804 under a number of circumstances. A stock symbol designated in an order may have changed or the account number of the barter order is changed. Optionally, maintenance program 804 generates indexes and tables to facilitate quick access to the database records.

Optionally, if the system included a separate database of each individual's portfolio for all securities, the system can perform similar access routines and maintenance routines as described above.

Other modifications, configurations and adaptions will be apparent to those of ordinary skill in the art and are within the scope of the present invention.

What is claimed is:

1. A method for trading securities on a computer-based network comprising a processor, a barter application programming interface (Barter API), and an ordering module comprising a graphical user interface (GUI), the method comprising:
   storing, by the ordering module, a plurality of securities to trade and associated quantities thereof;
   displaying in a dynamic display area (610), by the GUI, a portfolio of a user including a plurality of user-owned securities and associated quantities thereof;
   receiving, by the GUI, a trade selection from the user, at a trade selection time, of a first order comprising one of the plurality of user-owned securities to trade and associated quantity thereof;
   posting, by the processor using a database module associated with the computer-based network, the first order into a database;
   searching, by the processor using a matching engine associated with the computer-based network, the database for a second order matching the first order;
   determining, by the processor of the computer-based network, if the first order can be traded with the second order at the current market price of the first order plus or minus a first value;
   displaying, by the GUI, in a static display area (620) aligned with the dynamic display area (610) the first order and the second order valued as of the trade selection time;
   receiving a user selection to initiate a trade comprising the first order and the second order; and
   completing, by the processor of the computer-based network, the trade comprising the first order and the second order and charging an appropriate fee.

2. The method of claim 1 wherein the ordering module provides the graphical user interface.

3. The method of claim 1 wherein the receiving is performed by the ordering module.

4. The method of claim 1 wherein the determining further comprises determining, by the computer-based network, if the first order can be traded with the second order at the current market price of the second order plus or minus a second value.

5. The method of claim 1 further comprising populating the graphical user interface with the current market price of the first order plus or minus the first value.

6. The method of claim 1 further comprising populating the graphical user interface with the current market price of the second order plus or minus a second value.

7. The method of claim 1 wherein the searching comprises searching, by the matching engine, the database for the second order and a third order matching the first order.

8. The method of claim 7 wherein the determining further comprises determining, by the computer-based network, if the first order can be traded with the third order at the current market price of the third order plus or minus a third value.

9. The method of claim 1 further comprising providing an e-mail system allowing users interested in trading to present offers to one another.

10. The method of claim 1 further comprising facilitating negotiations between users.

11. The method of claim 1 further comprising providing a link to allow access via an investing company website.

12. A computerized system for securities trading on a computer network comprising a barter application programming interface (Barter API), and an ordering module comprising a graphical user interface (GUI), the network comprising:
- a processor;
- an input device connected to the processor;
- an output device connected to the processor;
- a memory connected to the processor and storing instructions to control the operation of the processor;
- the instructions directing the processor to:
  - provide access to the network, the computer system storing, by the ordering module, a plurality of securities to trade and associated quantities thereof;
  - display, by the GUI, in a dynamic display area (610), a portfolio of a user including a plurality of user-owned securities and associated quantities thereof;
  - process, using the input device, a trade selection from the user, at a trade selection time, of a first order comprising one of the plurality of user-owned securities to trade and associated quantity thereof;
  - post the first order into a database;
  - search the database for a second order matching the first order;
  - determine if the first order can be traded with the second order at the current market price of the first order plus or minus a first value;
  - display, by the GUI, in a static display area (620) aligned with the dynamic display area (610) the first order and the second order valued as of the trade selection time;
  - receive, using the input device, a user selection to initiate a trade comprising the first order and the second order; and
  - complete a trade comprising the first order and the second order and charging an appropriate fee.

13. The system of claim 12 wherein the instructions further direct the processor to determine if the first order can be traded with the second order at the current market price of the second order plus or minus a second value.

14. The system of claim 12 wherein the instructions further direct the processor to populate the graphical user interface with the current market price of the first order plus or minus the first value.

15. The system of claim 12 wherein the instructions further direct the processor to populate the graphical user interface with the current market price of the second order plus or minus a second value.

16. The system of claim 12 wherein the instructions further direct the processor to search the database for the second order and a third order matching the first order.

17. The system of claim 16 wherein the instructions further direct the processor to determine if the first order can be traded with the third order at the current market price of the third order plus or minus a third value.

18. The system of claim 12 wherein the instructions further direct the processor to provide an e-mail system allowing users interested in trading to present offers to one another.

19. The system of claim 12 wherein the instructions further direct the processor to facilitate negotiations between users.

20. The system of claim 12 wherein the instructions further direct the processor to provide a link to allow access via an investing company website.

* * * * *